(12) United States Patent  (10) Patent No.: US 7,878,404 B2
Napper et al.  (45) Date of Patent: Feb. 1, 2011

(54) BAR CODE READING METHOD

(75) Inventors: Jonathon Leigh Napper, Balmain (AU); Paul Lapstun, Balmain (AU); Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 487 days.

(21) Appl. No.: 12/015,513

(22) Filed: Jan. 17, 2008

(65) Prior Publication Data

US 2008/0191024 A1  Aug. 14, 2008

Related U.S. Application Data

(60) Provisional application No. 60/888,775, filed on Feb. 8, 2007.

(51) Int. Cl.
*G06K 5/04* (2006.01)
*G06K 9/00* (2006.01)

(52) U.S. Cl. .................................. 235/462.12
(58) Field of Classification Search ................ 235/462.01–462.49
See application file for complete search history.

(56) References Cited

U.S. PATENT DOCUMENTS

| | | |
|---|---|---|
| 4,864,618 A | 9/1989 | Wright et al. |
| 5,051,736 A | 9/1991 | Bennett et al. |
| 5,477,012 A | 12/1995 | Sekendur |
| 5,652,412 A | 7/1997 | Lazzouni et al. |
| 5,661,506 A | 8/1997 | Lazzouni et al. |
| 5,692,073 A | 11/1997 | Cass |
| 5,852,434 A | 12/1998 | Sekendur |
| 5,979,768 A * | 11/1999 | Koenck ................. 235/470 |
| 6,076,734 A | 6/2000 | Dougherty et al. |
| 6,688,524 B1 * | 2/2004 | Bottazzi et al. ......... 235/462.12 |
| 6,698,656 B2 * | 3/2004 | Parker et al. .......... 235/462.01 |
| 6,964,374 B1 | 11/2005 | Djuknic et al. |
| 7,303,130 B2 * | 12/2007 | Solen et al. .......... 235/462.12 |
| 2005/0145698 A1 * | 7/2005 | Havens et al. ........ 235/462.12 |

FOREIGN PATENT DOCUMENTS

| | | |
|---|---|---|
| GB | 2306669 A | 5/1997 |
| WO | WO 99/18487 A2 | 4/1999 |
| WO | WO 99/50787 A1 | 10/1999 |
| WO | WO 2006/101437 A1 | 9/2006 |

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

* cited by examiner

*Primary Examiner*—Daniel A Hess

(57) ABSTRACT

A method of recovering a waveform representing a linear bar code, the method including the steps of: moving a sensing device relative to the barcode, said sensing device having a two-dimensional image sensor; capturing, using the image sensor, a plurality of two-dimensional partial images of said bar code during said movement; determining, from at least one of the images, a direction substantially perpendicular to the bars of the bar code; determining, substantially along the direction, a waveform fragment corresponding to each captured image; determining an alignment between each pair of successive waveform fragments; and recovering, from the aligned waveform fragments, the waveform.

19 Claims, 17 Drawing Sheets

BAR CODE READING METHOD

FIELD OF INVENTION

The present invention relates to a method and system for reading barcodes disposed on a surface. It has been developed primarily to enable acquisition of linear barcodes using a camera with a field of view smaller than the barcode.

COPENDING

The following applications have been filed by the Applicant simultaneously with the present application:

Ser. Nos. 12/015507 12/015508 12/015509 12/015510 12/015511 12/015512.

The disclosures of these co-pending applications are incorporated herein by reference.

CROSS REFERENCES

The following patents or patent applications filed by the applicant or assignee of the present invention are hereby incorporated by cross-reference.

| | | | | | | |
|---|---|---|---|---|---|---|
| 6,276,850 | 6,520,631 | 6,158,907 | 6,539,180 | 6,270,177 | 6,405,055 | 6,628,430 |
| 6,835,135 | 6,626,529 | 6,981,769 | 7,125,338 | 7,125,337 | 7,136,186 | 7,286,260 |
| 7,145,689 | 7,130,075 | 7,081,974 | 7,177,055 | 7,209,257 | 6,443,555 | 7,161,715 |
| 7,154,632 | 7,158,258 | 7,148,993 | 7,075,684 | 10/943,905 | 10/943,906 | 10/943,904 |
| 10/943,903 | 10/943,902 | 6,966,659 | 6,988,841 | 7,077,748 | 7,255,646 | 7,070,270 |
| 7,014,307 | 7,158,809 | 7,217,048 | 11/225,172 | 11/255,942 | 11/329,039 | 11/329,040 |
| 7,271,829 | 11/442,189 | 11/474,280 | 11/483,061 | 11/503,078 | 11/520,735 | 11/505,858 |
| 11/525,850 | 11/583,870 | 11/592,983 | 11/592,208 | 11/601,828 | 11/635,482 | 11/635,526 |
| 10/466,440 | 7,215,441 | 11/650,545 | 11/653,241 | 11/653,240 | 7,056,040 | 6,942,334 |
| 11/706,300 | 11/740,265 | 11/737,720 | 11/739,056 | 11/740,204 | 11/740,223 | 11/753,557 |
| 11/750,285 | 11/758,648 | 11/778,559 | 11/834,634 | 11/838,878 | 11/845,669 | 6,799,853 |
| 7,237,896 | 6,749,301 | 10/451,722 | 7,137,678 | 7,252,379 | 7,144,107 | 10/503,900 |
| 10/503,898 | 10/503,897 | 7,220,068 | 7,270,410 | 7,241,005 | 7,108,437 | 7,140,792 |
| 10/503,922 | 7,224,274 | 10/503,917 | 10/503,918 | 10/503,925 | 10/503,927 | 10/503,928 |
| 10/503,929 | 10/503,885 | 7,195,325 | 7,229,164 | 7,150,523 | 10/503,889 | 7,154,580 |
| 6,906,778 | 7,167,158 | 7,128,269 | 6,688,528 | 6,986,613 | 6,641,315 | 7,278,702 |
| 10/503,891 | 7,150,524 | 7,155,395 | 6,915,140 | 6,999,206 | 6,795,651 | 6,883,910 |
| 7,118,481 | 7,136,198 | 7,092,130 | 6,786,661 | 6,808,325 | 10/920,368 | 10/920,284 |
| 7,219,990 | 10/920,283 | 6,750,901 | 6,476,863 | 6,788,336 | 6,322,181 | 6,597,817 |
| 6,227,648 | 6,727,948 | 6,690,419 | 10/470,947 | 6,619,654 | 6,969,145 | 6,679,582 |
| 10/470,942 | 6,568,670 | 6,866,373 | 7,280,247 | 7,008,044 | 6,742,871 | 6,966,628 |
| 6,644,781 | 6,969,143 | 6,767,076 | 6,834,933 | 6,692,113 | 6,913,344 | 6,727,951 |
| 7,128,395 | 7,036,911 | 7,032,995 | 6,969,151 | 6,955,424 | 6,969,162 | 10/919,249 |
| 6,942,315 | 11/006,577 | 7,234,797 | 6,986,563 | 7,295,211 | 11/045,442 | 7,286,162 |
| 7,283,159 | 7,077,330 | 6,196,541 | 11/149,389 | 11/185,725 | 7,226,144 | 11/202,344 |
| 7,267,428 | 11/248,423 | 11/248,422 | 7,093,929 | 11/282,769 | 11/330,060 | 11/442,111 |
| 7,290,862 | 11/499,806 | 11/499,710 | 6,195,150 | 11/749,156 | 11/782,588 | 11/854,435 |
| 11/853,817 | 11/935,958 | 11/924,608 | 6,362,868 | 11/970,993 | 6,831,681 | 6,431,669 |
| 6,362,869 | 6,472,052 | 6,356,715 | 6,894,694 | 6,636,216 | 6,366,693 | 6,329,990 |
| 6,459,495 | 6,137,500 | 6,690,416 | 7,050,143 | 6,398,328 | 7,110,024 | 6,431,704 |
| 6,879,341 | 6,415,054 | 6,665,454 | 6,542,645 | 6,486,886 | 6,381,361 | 6,317,192 |
| 6,850,274 | 09/113,054 | 6,646,757 | 6,624,848 | 6,357,135 | 6,271,931 | 6,353,772 |
| 6,106,147 | 6,665,008 | 6,304,291 | 6,305,770 | 6,289,262 | 6,315,200 | 6,217,165 |
| 6,496,654 | 6,859,225 | 6,924,835 | 6,647,369 | 6,943,830 | 09/693,317 | 7,021,745 |
| 6,712,453 | 6,460,971 | 6,428,147 | 6,416,170 | 6,402,300 | 6,464,340 | 6,612,687 |
| 6,412,912 | 6,447,099 | 6,837,567 | 6,505,913 | 7,128,845 | 6,733,684 | 7,249,108 |
| 6,566,858 | 6,331,946 | 6,246,970 | 6,442,525 | 09/517,384 | 09/505,951 | 6,374,354 |
| 7,246,098 | 6,816,968 | 6,757,832 | 6,334,190 | 6,745,331 | 7,249,109 | 10/203,559 |
| 7,197,642 | 7,093,139 | 10/636,263 | 10/636,283 | 10/866,608 | 7,210,038 | 10/902,883 |
| 10/940,653 | 10/942,858 | 11/706,329 | 11/757,385 | 11/758,642 | 7,119,836 | 7,283,162 |
| 7,286,169 | 10/636,285 | 7,170,652 | 6,967,750 | 6,995,876 | 7,099,051 | 7,172,191 |
| 7,243,916 | 7,222,845 | 11/239,232 | 7,285,227 | 7,063,940 | 11/107,942 | 7,193,734 |
| 7,086,724 | 7,090,337 | 7,278,723 | 7,140,717 | 11/190,902 | 11/209,711 | 7,256,824 |
| 7,140,726 | 7,156,512 | 7,186,499 | 11/478,585 | 11/525,862 | 11/540,574 | 11/583,875 |
| 11/592,181 | 6,750,944 | 11/599,336 | 7,291,447 | 11/744,183 | 11/758,646 | 11/778,561 |
| 11/839,532 | 11/838,874 | 11/853,021 | 11/869,710 | 11/868,531 | 11/927,403 | 11/951,960 |
| 10/636,225 | 6,985,207 | 6,773,874 | 6,650,836 | 10/666,495 | 10/636,224 | 7,250,975 |
| 7,295,343 | 6,880,929 | 7,236,188 | 7,236,187 | 7,155,394 | 10/636,219 | 10/636,223 |
| 7,055,927 | 6,986,562 | 7,052,103 | 7,312,845 | 10/656,281 | 10/656,791 | 10/666,124 |
| 10/683,217 | 7,289,142 | 7,095,533 | 6,914,686 | 6,896,252 | 6,820,871 | 6,834,851 |
| 6,848,686 | 6,830,246 | 6,851,671 | 10/729,098 | 7,092,011 | 7,187,404 | 10/729,159 |
| 10/753,458 | 6,878,299 | 6,929,348 | 6,921,154 | 10/780,625 | 10/804,042 | 6,913,346 |
| 10/831,238 | 10/831,237 | 10/831,239 | 10/831,240 | 10/831,241 | 10/831,234 | 10/831,233 |
| 7,246,897 | 7,077,515 | 10/831,235 | 10/853,336 | 10/853,117 | 10/853,659 | 10/853,681 |
| 6,913,875 | 7,021,758 | 7,033,017 | 7,161,709 | 7,099,033 | 7,147,294 | 7,156,494 |
| 11/012,024 | 11/011,925 | 7,032,998 | 7,044,585 | 7,296,867 | 6,994,424 | 11/006,787 |
| 7,258,435 | 7,097,263 | 7,001,012 | 7,004,568 | 7,040,738 | 7,188,933 | 7,027,080 |
| 7,025,446 | 6,991,321 | 7,131,715 | 7,261,392 | 7,207,647 | 7,182,435 | 7,097,285 |
| 11/228,410 | 7,097,284 | 7,083,264 | 7,147,304 | 7,232,203 | 7,156,498 | 7,201,471 |
| 11/501,772 | 11/503,084 | 11/513,073 | 7,210,764 | 11/635,524 | 11/706,379 | 11/730,386 |
| 11/730,784 | 11/753,568 | 11/782,591 | 11/859,783 | 6,710,457 | 6,775,906 | 6,507,099 |
| 7,221,043 | 7,107,674 | 7,154,172 | 11/442,400 | 7,247,941 | 11/736,540 | 11/758,644 |
| 11/940,304 | 6,530,339 | 6,631,897 | 6,851,667 | 6,830,243 | 6,860,479 | 6,997,452 |
| 7,000,913 | 7,204,482 | 11/212,759 | 11/281,679 | 11/730,409 | 6,238,044 | 6,425,661 |

-continued

| | | | | | | |
|---|---|---|---|---|---|---|
| 11/003,786 | 7,258,417 | 7,293,853 | 11/003,334 | 7,270,395 | 11/003,404 | 11/003,419 |
| 11/003,700 | 7,255,419 | 7,284,819 | 7,229,148 | 7,258,416 | 7,273,263 | 7,270,393 |
| 6,984,017 | 11/003,699 | 11/071,473 | 7,156,497 | 11/601,670 | 11/748,482 | 11/778,563 |
| 11/779,851 | 11/778,574 | 11/853,816 | 11/853,814 | 11/853,786 | 11/872,037 | 11/856,694 |
| 11/965,703 | 11/003,463 | 11/003,701 | 11/003,683 | 11/003,614 | 7,284,820 | 11/003,684 |
| 7,246,875 | 11/003,617 | 11/764,760 | 11,853,777 | 11,955,354 | 11/293,800 | 11/293,802 |
| 11/293,801 | 11/293,808 | 11/293,809 | 11/482,975 | 11/482,970 | 11/482,968 | 11/482,972 |
| 11/482,971 | 11/482,969 | 6,431,777 | 6,334,664 | 6,447,113 | 7,239,407 | 6,398,359 |
| 6,652,089 | 6,652,090 | 7,057,759 | 6,631,986 | 7,187,470 | 7,280,235 | 11/501,775 |
| 11/744,210 | 11/859,784 | 6,471,331 | 6,676,250 | 6,347,864 | 6,439,704 | 6,425,700 |
| 6,588,952 | 6,626,515 | 6,722,758 | 6,871,937 | 11/060,803 | 11/097,266 | 11/097,267 |
| 11/685,084 | 11/685,086 | 11/685,090 | 11/740,925 | 11/763,444 | 11/763,443 | 11/946,840 |
| 11/961,712 | 7,249,942 | 7,206,654 | 7,162,324 | 7,162,325 | 7,231,275 | 7,146,236 |
| 7,278,847 | 10/753,499 | 6,997,698 | 7,220,112 | 7,231,276 | 10/753,440 | 7,220,115 |
| 7,195,475 | 7,144,242 | 11/499,746 | 11/501,774 | 11/525,858 | 11/545,501 | 11/599,335 |
| 11/706,380 | 11,736,545 | 11/736,554 | 11/739,047 | 11,749,159 | 11/739,073 | 11/775,160 |
| 11/853,755 | 11/940,291 | 11,934,071 | 11,951,913 | 6,786,420 | 6,827,282 | 6,948,661 |
| 7,073,713 | 10/983,060 | 7,093,762 | 7,083,108 | 7,222,799 | 7,201,319 | 11/442,103 |
| 11/739,071 | 11/518,238 | 11/518,280 | 11/518,244 | 11/518,243 | 11/518,242 | 7,032,899 |
| 6,854,724 | 11/084,237 | 11/084,240 | 11/084,238 | 11/357,296 | 11/357,298 | 11/357,297 |
| 6,350,023 | 6,318,849 | 6,592,207 | 6,439,699 | 6,312,114 | 11/246,676 | 11/246,677 |
| 11/246,678 | 11/246,679 | 11/246,680 | 11/246,681 | 11/246,714 | 11/246,713 | 11/246,689 |
| 11/246,671 | 11/246,670 | 11/246,669 | 11/246,704 | 11/246,710 | 11/246,688 | 11/246,716 |
| 11/246,715 | 11/246,707 | 11/246,706 | 11/246,705 | 11/246,708 | 11/246,693 | 11/246,692 |
| 11/246,696 | 11/246,695 | 11/246,694 | 11/482,958 | 11/482,955 | 11/482,962 | 11/482,963 |
| 11/482,956 | 11/482,954 | 11/482,974 | 11/482,957 | 11/482,987 | 11/482,959 | 11/482,960 |
| 11/482,961 | 11/482,964 | 11/482,965 | 11/482,976 | 11/482,973 | 11/495,815 | 11/495,816 |
| 11/495,817 | 60/992,635 | 60/992,637 | 60/992,641 | 10/803,074 | 10/803,073 | 7,040,823 |
| 10/803,076 | 10/803,077 | 10/803,078 | 10/803,079 | 10/922,971 | 10/922,970 | 10/922,836 |
| 10/922,842 | 10/922,848 | 10/922,843 | 7,125,185 | 7,229,226 | 11/513,386 | 11/753,559 |
| 10/815,621 | 7,243,835 | 10/815,630 | 10/815,637 | 10/815,638 | 7,251,050 | 10/815,642 |
| 7,097,094 | 7,137,549 | 10/815,618 | 7,156,292 | 11,738,974 | 10/815,635 | 10/815,647 |
| 10/815,634 | 7,137,566 | 7,131,596 | 7,128,265 | 7,207,485 | 7,197,374 | 7,175,089 |
| 10/815,617 | 10/815,620 | 7,178,719 | 10/815,613 | 7,207,483 | 7,296,737 | 7,270,266 |
| 10/815,614 | 11/446,240 | 11/488,162 | 11/488,163 | 11/488,164 | 11/488,167 | 11/488,168 |
| 11/488,165 | 11/488,166 | 7,267,273 | 11/834,628 | 11/839,497 | 11/944,449 | 10/815,636 |
| 7,128,270 | 11/041,650 | 11/041,651 | 11/041,652 | 11/041,649 | 11/041,610 | 11/863,253 |
| 11/863,255 | 11/863,257 | 11/863,258 | 11/863,262 | 11/041,609 | 11/041,626 | 11/041,627 |
| 11/041,624 | 11/041,625 | 11/863,268 | 11/863,269 | 11/863,270 | 11/863,271 | 11/863,273 |
| 76,584,733 | 11/041,556 | 11/041,580 | 11/041,723 | 11/041,698 | 11/041,648 | 11/863,263 |
| 11/863,264 | 11/863,265 | 11/863,266 | 11/863,267 | 10/815,609 | 7,150,398 | 7,159,777 |
| 10/815,610 | 7,188,769 | 7,097,106 | 7,070,110 | 7,243,849 | 11/442,381 | 11/480,957 |
| 11/764,694 | 11,957,470 | 6,227,652 | 6,213,588 | 6,213,589 | 6,231,163 | 6,247,795 |
| 6,394,581 | 6,244,691 | 6,257,704 | 6,416,168 | 6,220,694 | 6,257,705 | 6,247,794 |
| 6,234,610 | 6,247,793 | 6,264,306 | 6,241,342 | 6,247,792 | 6,264,307 | 6,254,220 |
| 6,234,611 | 6,302,528 | 6,283,582 | 6,239,821 | 6,338,547 | 6,247,796 | 6,557,977 |
| 6,390,603 | 6,362,843 | 6,293,653 | 6,312,107 | 6,227,653 | 6,234,609 | 6,238,040 |
| 6,188,415 | 6,227,654 | 6,209,989 | 6,247,791 | 6,336,710 | 6,217,153 | 6,416,167 |
| 6,243,113 | 6,283,581 | 6,247,790 | 6,260,953 | 6,267,469 | 6,588,882 | 6,742,873 |
| 6,918,655 | 6,547,371 | 6,938,989 | 6,598,964 | 6,923,526 | 6,273,544 | 6,309,048 |
| 6,420,196 | 6,443,558 | 6,439,689 | 6,378,989 | 6,848,181 | 6,634,735 | 6,299,289 |
| 6,299,290 | 6,425,654 | 6,902,255 | 6,623,101 | 6,406,129 | 6,505,916 | 6,457,809 |
| 6,550,895 | 6,457,812 | 7,152,962 | 6,428,133 | 7,216,956 | 7,080,895 | 11/144,844 |
| 7,182,437 | 11/599,341 | 11/635,533 | 11/607,976 | 11/607,975 | 11/607,999 | 11/607,980 |
| 11/607,979 | 11/607,978 | 11/735,961 | 11/685,074 | 11/696,126 | 11/696,144 | 11/696,650 |
| 11/763,446 | 6,224,780 | 6,235,212 | 6,280,643 | 6,284,147 | 6,214,244 | 6,071,750 |
| 6,267,905 | 6,251,298 | 6,258,285 | 6,225,138 | 6,241,904 | 6,299,786 | 6,866,789 |
| 6,231,773 | 6,190,931 | 6,248,249 | 6,290,862 | 6,241,906 | 6,565,762 | 6,241,905 |
| 6,451,216 | 6,231,772 | 6,274,056 | 6,290,861 | 6,248,248 | 6,306,671 | 6,331,258 |
| 6,110,754 | 6,294,101 | 6,416,679 | 6,264,849 | 6,254,793 | 6,245,246 | 6,855,264 |
| 6,235,211 | 6,491,833 | 6,264,850 | 6,258,284 | 6,312,615 | 6,228,668 | 6,180,427 |
| 6,171,875 | 6,267,904 | 6,245,247 | 6,315,914 | 7,169,316 | 6,526,658 | 7,210,767 |
| 11/056,146 | 11/635,523 | 6,665,094 | 6,450,605 | 6,512,596 | 6,654,144 | 7,125,090 |
| 6,687,022 | 7,072,076 | 7,092,125 | 7,215,443 | 7,136,195 | 7,077,494 | 6,877,834 |
| 6,969,139 | 10/636,227 | 7,283,280 | 6,912,067 | 7,277,205 | 7,154,637 | 10/636,230 |
| 7,070,251 | 6,851,782 | 10/636,211 | 10/636,247 | 6,843,545 | 7,079,286 | 7,064,867 |
| 7,065,247 | 7,027,177 | 7,218,415 | 7,064,873 | 6,954,276 | 7,061,644 | 7,092,127 |
| 7,059,695 | 10/990,382 | 7,177,052 | 7,270,394 | 11/124,231 | 7,188,921 | 7,187,469 |
| 7,196,820 | 11/281,445 | 7,283,281 | 7,251,051 | 7,245,399 | 11/524,911 | 11/640,267 |
| 11/706,297 | 11/730,387 | 11/737,142 | 11/764,729 | 11/834,637 | 11/853,019 | 11/863,239 |
| 11/305,274 | 11/305,273 | 11/305,275 | 11/305,152 | 11/305,158 | 11/305,008 | 6,231,148 |
| 6,293,658 | 6,614,560 | 6,238,033 | 6,312,070 | 6,238,111 | 6,378,970 | 6,196,739 |
| 6,270,182 | 6,152,619 | 7,006,143 | 6,876,394 | 6,738,096 | 6,970,186 | 6,287,028 |
| 6,412,993 | 11/033,145 | 11/102,845 | 11/102,861 | 11/248,421 | 11/672,878 | 7,204,941 |
| 7,282,164 | 10/815,628 | 11/845,672 | 7,278,727 | 10/913,373 | 10/913,374 | 10/913,372 |
| 7,138,391 | 7,153,956 | 10/913,380 | 10/913,379 | 10/913,376 | 7,122,076 | 7,148,345 |
| 11/172,816 | 11/172,815 | 11/172,814 | 11/482,990 | 11/482,986 | 11/482,985 | 11/454,899 |
| 11/583,942 | 11/592,990 | 11,849,360 | 11/831,961 | 11/831,962 | 11/831,963 | 60/951,700 |
| 11/832,629 | 11/832,637 | 60/971,535 | 10/407,212 | 7,252,366 | 10/683,064 | 10/683,041 |

-continued

| | | | | | | |
|---|---|---|---|---|---|---|
| 7,275,811 | 10/884,889 | 10/922,890 | 10/922,875 | 10/922,885 | 10/922,889 | 10/922,884 |
| 10/922,879 | 10/922,887 | 10/922,888 | 10/922,874 | 7,234,795 | 10/922,871 | 10/922,880 |
| 7,293,855 | 10/922,882 | 10/922,883 | 10/922,878 | 10/922,872 | 10/922,876 | 10/922,886 |
| 10/922,877 | 7,147,792 | 7,175,774 | 11/159,193 | 11/491,378 | 11,766,713 | 11/841,647 |
| 11/482,980 | 11/563,684 | 11/482,967 | 11/482,966 | 11/482,988 | 11/482,989 | 11/293,832 |
| 11/293,838 | 11/293,825 | 11/293,841 | 11/293,799 | 11/293,796 | 11/293,797 | 11/293,798 |
| 11/124,158 | 11/124,196 | 11/124,199 | 11/124,162 | 11/124,202 | 11/124,197 | 11/124,154 |
| 11/124,198 | 7,284,921 | 11/124,151 | 11/124,160 | 11/124,192 | 11/124,175 | 11/124,163 |
| 11/124,149 | 11/124,152 | 11/124,173 | 11/124,155 | 7,236,271 | 11/124,174 | 11/124,194 |
| 11/124,164 | 11/124,200 | 11/124,195 | 11/124,166 | 11/124,150 | 11/124,172 | 11/124,165 |
| 11/124,186 | 11/124,185 | 11/124,184 | 11/124,182 | 11/124,201 | 11/124,171 | 11/124,181 |
| 11/124,161 | 11/124,156 | 11/124,191 | 11/124,159 | 11/124,176 | 11/124,188 | 11/124,170 |
| 11/124,187 | 11/124,189 | 11/124,190 | 11/124,180 | 11/124,193 | 11/124,183 | 11/124,178 |
| 11/124,177 | 11/124,148 | 11/124,168 | 11/124,167 | 11/124,179 | 11/124,169 | 11/187,976 |
| 11/188,011 | 11/188,014 | 11/482,979 | 11/735,490 | 11/853,018 | 11/944,450 | 11/228,540 |
| 11/228,500 | 11/228,501 | 11/228,530 | 11/228,490 | 11/228,531 | 11/228,504 | 11/228,533 |
| 11/228,502 | 11/228,507 | 11/228,482 | 11/228,505 | 11/228,497 | 11/228,487 | 11/228,529 |
| 11/228,484 | 11/228,489 | 11/228,518 | 11/228,536 | 11/228,496 | 11/228,488 | 11/228,506 |
| 11/228,516 | 11/228,526 | 11/228,539 | 11/228,538 | 11/228,524 | 11/228,523 | 11/228,519 |
| 11/228,528 | 11/228,527 | 11/228,525 | 11/228,520 | 11/228,498 | 11/228,511 | 11/228,522 |
| 11/228,515 | 11/228,537 | 11/228,534 | 11/228,491 | 11/228,499 | 11/228,509 | 11/228,492 |
| 11/228,493 | 11/228,510 | 11/228,508 | 11/228,512 | 11/228,514 | 11/228,494 | 11/228,495 |
| 11/228,486 | 11/228,481 | 11/228,477 | 11/228,485 | 11/228,483 | 11/228,521 | 11/228,517 |
| 11/228,532 | 11/228,513 | 11/228,503 | 11/228,480 | 11/228,535 | 11/228,478 | 11/228,479 |
| 6,238,115 | 6,386,535 | 6,398,344 | 6,612,240 | 6,752,549 | 6,805,049 | 6,971,313 |
| 6,899,480 | 6,860,664 | 6,925,935 | 6,966,636 | 7,024,995 | 7,284,852 | 6,926,455 |
| 7,056,038 | 6,869,172 | 7,021,843 | 6,988,845 | 6,964,533 | 6,981,809 | 7,284,822 |
| 7,258,067 | 11/155,544 | 7,222,941 | 7,284,925 | 7,278,795 | 7,249,904 | 11/737,726 |
| 11,772,240 | 11/863,246 | 11/863,145 | 11/865,650 | 6,087,638 | 6,340,222 | 6,041,600 |
| 6,299,300 | 6,067,797 | 6,286,935 | 6,044,646 | 6,382,769 | 6,787,051 | 6,938,990 |
| 11/242,916 | 11/144,799 | 11/198,235 | 11,861,282 | 11,861,284 | 11/766,052 | 7,152,972 |
| 11/592,996 | D529952 | 6,390,605 | 6,322,195 | 6,612,110 | 6,480,089 | 6,460,778 |
| 6,305,788 | 6,426,014 | 6,364,453 | 6,457,795 | 6,315,399 | 6,338,548 | 7,040,736 |
| 6,938,992 | 6,994,425 | 6,863,379 | 6,540,319 | 6,994,421 | 6,984,019 | 7,008,043 |
| 6,997,544 | 6,328,431 | 6,991,310 | 10/965,772 | 7,140,723 | 6,328,425 | 6,982,184 |
| 7,267,423 | 7,134,741 | 7,066,577 | 7,152,945 | 11/038,200 | 7,021,744 | 6,991,320 |
| 7,155,911 | 11/107,799 | 6,595,624 | 7,152,943 | 7,125,103 | 11/209,709 | 7,290,857 |
| 7,285,437 | 7,229,151 | 11/330,058 | 7,237,873 | 11/329,163 | 11/442,180 | 11/450,431 |
| 7,213,907 | 6,417,757 | 11/482,951 | 11/545,566 | 11/583,826 | 11/604,315 | 11/604,323 |
| 11/643,845 | 11/706,950 | 11/730,399 | 11/749,121 | 11/753,549 | 11/834,630 | 11/935,389 |
| 11/869,670 | 7,095,309 | 11/945,157 | 11,957,473 | 11/967,235 | 6,854,825 | 6,623,106 |
| 6,672,707 | 6,575,561 | 6,817,700 | 6,588,885 | 7,075,677 | 6,428,139 | 6,575,549 |
| 6,846,692 | 6,425,971 | 7,063,993 | 6,383,833 | 6,955,414 | 6,412,908 | 6,746,105 |
| 6,953,236 | 6,412,904 | 7,128,388 | 6,398,343 | 6,652,071 | 6,793,323 | 6,659,590 |
| 6,676,245 | 7,201,460 | 6,464,332 | 6,659,593 | 6,478,406 | 6,978,613 | 6,439,693 |
| 6,502,306 | 6,966,111 | 6,863,369 | 6,428,142 | 6,874,868 | 6,390,591 | 6,799,828 |
| 6,896,358 | 7,018,016 | 10/296,534 | 6,328,417 | 6,322,194 | 6,382,779 | 6,629,745 |
| 6,565,193 | 6,609,786 | 6,609,787 | 6,439,908 | 6,684,503 | 6,843,551 | 6,764,166 |
| 6,561,617 | 10/510,092 | 6,557,970 | 6,546,628 | 10/510,098 | 6,652,074 | 6,820,968 |
| 7,175,260 | 6,682,174 | 7,303,262 | 6,648,453 | 6,834,932 | 6,682,176 | 6,998,062 |
| 6,767,077 | 7,278,717 | 6,755,509 | 10/534,813 | 6,692,108 | 10/534,811 | 6,672,709 |
| 7,303,263 | 7,086,718 | 10/534,881 | 6,672,710 | 10/534,812 | 6,669,334 | 10/534,804 |
| 7,152,958 | 7,281,782 | 6,824,246 | 7,264,336 | 6,669,333 | 10/534,815 | 6,820,967 |
| 7,306,326 | 6,736,489 | 7,264,335 | 6,719,406 | 7,222,943 | 7,188,419 | 7,168,166 |
| 6,974,209 | 7,086,719 | 6,974,210 | 7,195,338 | 7,252,775 | 7,101,025 | 11/474,281 |
| 11/485,258 | 11/706,304 | 11/706,324 | 11/706,326 | 11/706,321 | 11/772,239 | 11/782,598 |
| 11/829,941 | 11/852,991 | 11,852,986 | 11/936,062 | 11/934,027 | 11,955,028 | 11/763,440 |
| 11/763,442 | 11/246,687 | 11/246,718 | 11/246,685 | 11/246,686 | 11/246,703 | 11/246,691 |
| 11/246,711 | 11/246,690 | 11/246,712 | 11/246,717 | 11/246,709 | 11/246,700 | 11/246,701 |
| 11/246,702 | 11/246,668 | 11/246,697 | 11/246,698 | 11/246,699 | 11/246,675 | 11/246,674 |
| 11/246,667 | 11/829,957 | 11/829,960 | 11/829,961 | 11/829,962 | 11/829,963 | 11/829,966 |
| 11/829,967 | 11/829,968 | 11/829,969 | 11/946,839 | 11/946,838 | 11/946,837 | 11/951,230 |
| 7,156,508 | 7,159,972 | 7,083,271 | 7,165,834 | 7,080,894 | 7,201,469 | 7,090,336 |
| 7,156,489 | 10/760,233 | 10/760,246 | 7,083,257 | 7,258,422 | 7,255,423 | 7,219,980 |
| 10/760,253 | 10/760,255 | 10/760,209 | 7,118,192 | 10/760,194 | 10/760,238 | 7,077,505 |
| 7,198,354 | 7,077,504 | 10/760,189 | 7,198,355 | 10/760,232 | 10/760,231 | 7,152,959 |
| 7,213,906 | 7,178,901 | 7,222,938 | 7,108,353 | 7,104,629 | 11/446,227 | 11/454,904 |
| 11/472,345 | 11/474,273 | 7,261,401 | 11/474,279 | 11/482,939 | 11/482,950 | 11/499,709 |
| 7,306,324 | 7,306,325 | 11/603,824 | 11/601,756 | 11/601,672 | 7,303,261 | 11/653,253 |
| 11/706,328 | 11/706,299 | 11/706,965 | 11/737,080 | 11/737,041 | 11/778,062 | 11/778,566 |
| 11/782,593 | 11/934,018 | 11/945,157 | 11,951,095 | 11,951,828 | 11,954,906 | 11,954,949 |
| 11/967,226 | 7,303,930 | 11/246,672 | 11/246,673 | 11/246,683 | 11/246,682 | 60/939,086 |
| 11,860,538 | 11,860,539 | 11,860,540 | 11,860,541 | 11,860,542 | 11/936,060 | 11,877,667 |
| 11,877,668 | 7,246,886 | 7,128,400 | 7,108,355 | 6,991,322 | 7,287,836 | 7,118,197 |
| 10/728,784 | 10/728,783 | 7,077,493 | 6,962,402 | 10/728,803 | 7,147,308 | 10/728,779 |
| 7,118,198 | 7,168,790 | 7,172,270 | 7,229,155 | 6,830,318 | 7,195,342 | 7,175,261 |
| 10/773,183 | 7,108,356 | 7,118,202 | 10/773,186 | 7,134,744 | 10/773,185 | 7,134,743 |
| 7,182,439 | 7,210,768 | 10/773,187 | 7,134,745 | 7,156,484 | 7,118,201 | 7,111,926 |
| 10/773,184 | 7,018,021 | 11/060,751 | 11/060,805 | 11/188,017 | 7,128,402 | 11/298,774 |

-continued

| | | | | | | |
|---|---|---|---|---|---|---|
| 11/329,157 | 11/490,041 | 11/501,767 | 7,284,839 | 7,246,885 | 7,229,156 | 11/505,846 |
| 11/505,857 | 7,293,858 | 11/524,908 | 11/524,938 | 7,258,427 | 11/524,912 | 7,278,716 |
| 11/592,995 | 11/603,825 | 11/649,773 | 11/650,549 | 11/653,237 | 11/706,378 | 11/706,962 |
| 11/749,118 | 11/754,937 | 11/749,120 | 11/744,885 | 11/779,850 | 11/765,439 | 11/842,950 |
| 11/839,539 | 11/926,121 | 11/097,308 | 11/097,309 | 7,246,876 | 11/097,299 | 11/097,310 |
| 11/097,213 | 11/210,687 | 11/097,212 | 7,147,306 | 7,261,394 | 11/764,806 | 11/782,595 |
| 11/965,696 | 11/482,953 | 11/482,977 | 11/544,778 | 11/544,779 | 11/764,808 | 11/756,624 |
| 11/756,625 | 11/756,626 | 11/756,627 | 11/756,628 | 11/756,629 | 11/756,630 | 11/756,631 |
| 7,156,289 | 7,178,718 | 7,225,979 | 11/712,434 | 11/084,796 | 11/084,742 | 11/084,806 |
| 09/575,197 | 7,079,712 | 6,825,945 | 09/575,165 | 6,813,039 | 7,190,474 | 6,987,506 |
| 6,824,044 | 7,038,797 | 6,980,318 | 6,816,274 | 7,102,772 | 09/575,186 | 6,681,045 |
| 6,678,499 | 6,679,420 | 6,963,845 | 6,976,220 | 6,728,000 | 7,110,126 | 7,173,722 |
| 6,976,035 | 6,813,558 | 6,766,942 | 6,965,454 | 6,995,859 | 7,088,459 | 6,720,985 |
| 7,286,113 | 6,922,779 | 6,978,019 | 6,847,883 | 7,131,058 | 7,295,839 | 09/607,843 |
| 09/693,690 | 6,959,298 | 6,973,450 | 7,150,404 | 6,965,882 | 7,233,924 | 09/575,181 |
| 09/722,174 | 7,175,079 | 7,162,259 | 6,718,061 | 10/291,523 | 10/291,471 | 7,012,710 |
| 6,825,956 | 10/291,481 | 7,222,098 | 10/291,825 | 7,263,508 | 7,031,010 | 6,972,864 |
| 6,862,105 | 7,009,738 | 6,989,911 | 6,982,807 | 10/291,576 | 6,829,387 | 6,714,678 |
| 6,644,545 | 6,609,653 | 6,651,879 | 10/291,555 | 7,293,240 | 10/291,592 | 10/291,542 |
| 7,044,363 | 7,004,390 | 6,867,880 | 7,034,953 | 6,987,581 | 7,216,224 | 10/291,821 |
| 7,162,269 | 7,162,222 | 7,290,210 | 7,293,233 | 7,293,234 | 6,850,931 | 6,865,570 |
| 6,847,961 | 10/685,523 | 10/685,583 | 7,162,442 | 10/685,584 | 7,159,784 | 10/804,034 |
| 10/793,933 | 6,889,896 | 10/831,232 | 7,174,056 | 6,996,274 | 7,162,088 | 10/943,874 |
| 10/943,872 | 10/944,044 | 7,259,884 | 10/944,043 | 7,167,270 | 10/943,877 | 6,986,459 |
| 10/954,170 | 7,181,448 | 10/981,626 | 10/981,616 | 10/981,627 | 7,231,293 | 7,174,329 |
| 10/992,713 | 7,295,922 | 7,200,591 | 11/020,106 | 11/020,260 | 11/020,321 | 11/020,319 |
| 11/026,045 | 11/059,696 | 11/051,032 | 11/059,674 | 11/107,944 | 11/107,941 | 11/082,940 |
| 11/082,815 | 11/082,827 | 11/082,829 | 6,991,153 | 6,991,154 | 11/124,256 | 11/123,136 |
| 11/154,676 | 11/159,196 | 11/182,002 | 11/202,251 | 11/202,252 | 11/202,253 | 11/203,200 |
| 11/202,218 | 11/206,778 | 11/203,424 | 11/222,977 | 11/228,450 | 11/227,239 | 11/286,334 |
| 7,225,402 | 11/329,187 | 11/349,143 | 11/491,225 | 11/491,121 | 11/442,428 | 11/454,902 |
| 11/442,385 | 11/478,590 | 7,271,931 | 11/520,170 | 11/603,057 | 11/706,964 | 11/739,032 |
| 11/739,014 | 11/834,633 | 11/830,848 | 11/830,849 | 11/839,542 | 11/866,394 | 11/934,077 |
| 11/951,874 | 7,068,382 | 7,007,851 | 6,957,921 | 6,457,883 | 10/743,671 | 7,044,381 |
| 11/203,205 | 7,094,910 | 7,091,344 | 7,122,685 | 7,038,066 | 7,099,019 | 7,062,651 |
| 6,789,194 | 6,789,191 | 10/900,129 | 7,278,018 | 10/913,350 | 10/982,975 | 10/983,029 |
| 11/331,109 | 6,644,642 | 6,502,614 | 6,622,999 | 6,669,385 | 6,827,116 | 7,011,128 |
| 10/949,307 | 6,549,935 | 6,987,573 | 6,727,996 | 6,591,884 | 6,439,706 | 6,760,119 |
| 7,295,332 | 7,064,851 | 6,826,547 | 6,290,349 | 6,428,155 | 6,785,016 | 6,831,682 |
| 6,741,871 | 6,927,871 | 6,980,306 | 6,965,439 | 6,840,606 | 7,036,918 | 6,977,746 |
| 6,970,264 | 7,068,389 | 7,093,991 | 7,190,491 | 10/901,154 | 10/932,044 | 10/962,412 |
| 7,177,054 | 10/962,552 | 10/965,733 | 10/965,933 | 10/974,742 | 10/982,974 | 7,180,609 |
| 10/986,375 | 11/107,817 | 7,292,363 | 11/149,160 | 11/206,756 | 11/250,465 | 7,202,959 |
| 11/653,219 | 11/706,309 | 11/730,389 | 11/730,392 | 60/953,443 | 11/866,387 | 60/974,077 |
| 6,982,798 | 6,870,966 | 6,822,639 | 6,474,888 | 6,627,870 | 6,724,374 | 6,788,982 |
| 7,263,270 | 6,788,293 | 6,946,672 | 6,737,591 | 7,091,960 | 09/693,514 | 6,792,165 |
| 7,105,753 | 6,795,593 | 6,980,704 | 6,768,821 | 7,132,612 | 7,041,916 | 6,797,895 |
| 7,015,901 | 7,289,882 | 7,148,644 | 10/778,056 | 10/778,058 | 10/778,060 | 10/778,059 |
| 10/778,063 | 10/778,062 | 10/778,061 | 10/778,057 | 7,096,199 | 7,286,887 | 10/917,467 |
| 10/917,466 | 10/917,465 | 7,218,978 | 7,245,294 | 7,277,085 | 7,187,370 | 10/917,436 |
| 10/943,856 | 10/919,379 | 7,019,319 | 10/943,878 | 10/943,849 | 7,043,096 | 7,148,499 |
| 11/144,840 | 11/155,556 | 11/155,557 | 11/193,481 | 11/193,435 | 11/193,482 | 11/193,479 |
| 11/255,941 | 11/281,671 | 11/298,474 | 7,245,760 | 11/488,832 | 11/495,814 | 11/495,823 |
| 11/495,822 | 11/495,821 | 11/495,820 | 11/653,242 | 11/754,370 | 60/911,260 | 11/829,936 |
| 11/839,494 | 11/866,305 | 11/866,313 | 11/866,324 | 11/866,336 | 11/866,348 | 11/866,359 |
| 11/970,951 | 7,055,739 | 7,233,320 | 6,830,196 | 6,832,717 | 7,182,247 | 7,120,853 |
| 7,082,562 | 6,843,420 | 10/291,718 | 6,789,731 | 7,057,608 | 6,766,944 | 6,766,945 |
| 7,289,103 | 10/291,559 | 7,299,969 | 7,264,173 | 10/409,864 | 7,108,192 | 10/537,159 |
| 7,111,791 | 7,077,333 | 6,983,878 | 10/786,631 | 7,134,598 | 10/893,372 | 6,929,186 |
| 6,994,264 | 7,017,826 | 7,014,123 | 7,134,601 | 7,150,396 | 10/971,146 | 7,017,823 |
| 7,025,276 | 7,284,701 | 7,080,780 | 11/074,802 | 11/442,366 | 11/749,158 | 11/842,948 |
| 10/492,169 | 10/492,152 | 10/492,168 | 10/492,161 | 7,308,148 | 10/502,575 | 10/531,229 |
| 10/683,151 | 10/531,733 | 10/683,040 | 10/510,391 | 10/919,260 | 10/510,392 | 10/778,090 |
| 11/944,404 | 11/936,638 | 6,957,768 | 09/575,172 | 7,170,499 | 7,106,888 | 7,123,239 |
| 6,982,701 | 6,982,703 | 7,227,527 | 6,786,397 | 6,947,027 | 6,975,299 | 7,139,431 |
| 7,048,178 | 7,118,025 | 6,839,053 | 7,015,900 | 7,010,147 | 7,133,557 | 6,914,593 |
| 10/291,546 | 6,938,826 | 7,278,566 | 7,123,245 | 6,992,662 | 7,190,346 | 11/074,800 |
| 11/074,782 | 11/074,777 | 11/075,917 | 7,221,781 | 11/102,843 | 7,213,756 | 11/188,016 |
| 7,180,507 | 7,263,225 | 7,287,688 | 11/737,094 | 11/753,570 | 11/782,596 | 11/865,711 |
| 11/856,061 | 11/856,062 | 11/856,064 | 11/856,066 | 11/672,522 | 11/672,950 | 11/672,947 |
| 11/672,891 | 11/672,954 | 11/672,533 | 11/754,310 | 11/754,321 | 11/754,320 | 11/754,319 |
| 11/754,318 | 11/754,317 | 11/754,316 | 11/754,315 | 11/754,314 | 11/754,313 | 11/754,312 |
| 11/754,311 | 6,593,166 | 7,132,679 | 6,940,088 | 7,119,357 | 7,307,272 | 6,755,513 |
| 6,974,204 | 6,409,323 | 7,055,930 | 6,281,912 | 6,893,109 | 6,604,810 | 6,824,242 |
| 6,318,920 | 7,210,867 | 6,488,422 | 6,655,786 | 6,457,810 | 6,485,135 | 6,796,731 |
| 6,904,678 | 6,641,253 | 7,125,106 | 6,786,658 | 7,097,273 | 6,824,245 | 7,222,947 |
| 6,918,649 | 6,860,581 | 6,929,351 | 7,063,404 | 6,969,150 | 7,004,652 | 6,871,938 |
| 6,905,194 | 6,846,059 | 6,997,626 | 10/974,881 | 7,029,098 | 6,966,625 | 7,114,794 |
| 7,207,646 | 7,077,496 | 7,284,831 | 11/072,529 | 7,152,938 | 7,182,434 | 7,182,430 |

-continued

| | | | | | | |
|---|---|---|---|---|---|---|
| 11/102,842 | 7,032,993 | 11/155,513 | 11/155,545 | 11/144,813 | 7,172,266 | 7,258,430 |
| 7,128,392 | 7,210,866 | 11/488,066 | 11/505,933 | 11/540,727 | 11/635,480 | 11/707,946 |
| 11/706,303 | 11/709,084 | 11/730,776 | 11/744,143 | 11/779,845 | 11/782,589 | 11/863,256 |
| 11/940,302 | 11/940,235 | 11/955,359 | 11/066,161 | 11/066,160 | 11/066,159 | 11/066,158 |
| 7,287,831 | 11/875,936 | 6,804,030 | 6,807,315 | 6,771,811 | 6,683,996 | 7,271,936 |
| 7,304,771 | 6,965,691 | 7,058,219 | 7,289,681 | 7,187,807 | 7,181,063 | 11/338,783 |
| 11/603,823 | 11/650,536 | 10/727,181 | 10/727,162 | 10/727,163 | 10/727,245 | 7,121,639 |
| 7,165,824 | 7,152,942 | 10/727,157 | 7,181,572 | 7,096,137 | 7,302,592 | 7,278,034 |
| 7,188,282 | 10/727,159 | 10/727,180 | 10/727,179 | 10/727,192 | 10/727,274 | 10/727,164 |
| 10/727,161 | 10/727,198 | 10/727,158 | 10/754,536 | 10/754,938 | 10/727,227 | 10/727,160 |
| 10/934,720 | 7,171,323 | 7,278,697 | 11/442,131 | 11/474,278 | 11/488,853 | 11/488,841 |
| 11/749,750 | 11/749,749 | 11/955,127 | 11/951,213 | 10/296,522 | 6,795,215 | 7,070,098 |
| 7,154,638 | 6,805,419 | 6,859,289 | 6,977,751 | 6,398,332 | 6,394,573 | 6,622,923 |
| 6,747,760 | 6,921,144 | 10/884,881 | 7,092,112 | 7,192,106 | 11/039,866 | 7,173,739 |
| 6,986,560 | 7,008,033 | 11/148,237 | 7,222,780 | 7,270,391 | 7,150,510 | 11/478,599 |
| 11/499,749 | 11/521,388 | 11/738,518 | 11/482,981 | 11/743,662 | 11/743,661 | 11/743,659 |
| 11/743,655 | 11/743,657 | 11/752,900 | 11/926,109 | 11/927,163 | 11/929,567 | 7,195,328 |
| 7,182,422 | 11/650,537 | 11/712,540 | 10/854,521 | 10/854,522 | 10/854,488 | 7,281,330 |
| 10/854,503 | 10/854,504 | 10/854,509 | 7,188,928 | 7,093,989 | 10/854,497 | 10/854,495 |
| 10/854,498 | 10/854,511 | 10/854,512 | 10/854,525 | 10/854,526 | 10/854,516 | 7,252,353 |
| 10/854,515 | 7,267,417 | 10/854,505 | 10/854,493 | 7,275,805 | 7,314,261 | 10/854,490 |
| 7,281,777 | 7,290,852 | 10/854,528 | 10/854,523 | 10/854,527 | 10/854,524 | 10/854,520 |
| 10/854,514 | 10/854,519 | 10/854,513 | 10/854,499 | 10/854,501 | 7,266,661 | 7,243,193 |
| 10/854,518 | 10/854,517 | 10/934,628 | 7,163,345 | 11/499,803 | 11/601,757 | 11/706,295 |
| 11/735,881 | 11/748,483 | 11/749,123 | 11/766,061 | 11/775,135 | 11/772,235 | 11/778,569 |
| 11/829,942 | 11/870,342 | 11/935,274 | 11/937,239 | 11/961,907 | 11/961,940 | 11/961,961 |
| 11/014,731 | D529081 | D541848 | D528597 | 6,924,907 | 6,712,452 | 6,416,160 |
| 6,238,043 | 6,958,826 | 6,812,972 | 6,553,459 | 6,967,741 | 6,956,669 | 6,903,766 |
| 6,804,026 | 7,259,889 | 6,975,429 | 10/636,234 | 10/636,233 | 7,301,567 | 10/636,216 |
| 7,274,485 | 7,139,084 | 7,173,735 | 7,068,394 | 7,286,182 | 7,086,644 | 7,250,977 |
| 7,146,281 | 7,023,567 | 7,136,183 | 7,083,254 | 6,796,651 | 7,061,643 | 7,057,758 |
| 6,894,810 | 6,995,871 | 7,085,010 | 7,092,126 | 7,123,382 | 7,061,650 | 10/853,143 |
| 6,986,573 | 6,974,212 | 7,307,756 | 7,173,737 | 10/954,168 | 7,246,868 | 11/065,357 |
| 7,137,699 | 11/107,798 | 7,148,994 | 7,077,497 | 11/176,372 | 7,248,376 | 11/225,158 |
| 11/225,154 | 7,173,729 | 11/442,132 | 11/478,607 | 11/503,085 | 11/545,502 | 11/583,943 |
| 11/585,946 | 11/653,239 | 11/653,238 | 11/764,781 | 11/764,782 | 11/779,884 | 11/845,666 |
| 11/872,637 | 11/944,401 | 11/940,215 | 11/544,764 | 11/544,765 | 11/544,772 | 11/544,773 |
| 11/544,774 | 11/544,775 | 11/544,776 | 11/544,766 | 11/544,767 | 11/544,771 | 11/544,770 |
| 11/544,769 | 11/544,777 | 11/544,768 | 11/544,763 | 11/293,804 | 11/293,840 | 11/293,803 |
| 11/293,833 | 11/293,834 | 11/293,835 | 11/293,836 | 11/293,837 | 11/293,792 | 11/293,794 |
| 11/293,839 | 11/293,826 | 11/293,829 | 11/293,830 | 11/293,827 | 11/293,828 | 7,270,494 |
| 11/293,823 | 11/293,824 | 11/293,831 | 11/293,815 | 11/293,819 | 11/293,818 | 11/293,817 |
| 11/293,816 | 11/838,875 | 11/482,978 | 11/640,356 | 11/640,357 | 11/640,358 | 11/640,359 |
| 11/640,360 | 11/640,355 | 11/679,786 | 11/872,714 | 10/760,254 | 10/760,210 | 10/760,202 |
| 7,201,468 | 10/760,198 | 10/760,249 | 7,234,802 | 7,303,255 | 7,287,846 | 7,156,511 |
| 10/760,264 | 7,258,432 | 7,097,291 | 10/760,222 | 10/760,248 | 7,083,273 | 10/760,192 |
| 10/760,203 | 10/760,204 | 10/760,205 | 10/760,206 | 10/760,267 | 10/760,270 | 7,198,352 |
| 10/760,271 | 7,303,251 | 7,201,470 | 7,121,655 | 7,293,861 | 7,232,208 | 10/760,186 |
| 10/760,261 | 7,083,272 | 7,261,400 | 11/474,272 | 11/474,315 | 7,311,387 | 11/583,874 |
| 7,303,258 | 11/706,322 | 11/706,968 | 11/749,119 | 11/749,157 | 11/779,848 | 11/782,590 |
| 11/855,152 | 11/855,151 | 11/870,327 | 11/934,780 | 11/935,992 | 11/951,193 | 11/014,764 |
| 11/014,763 | 11/014,748 | 11/014,747 | 11/014,761 | 11/014,760 | 11/014,757 | 7,303,252 |
| 7,249,822 | 11/014,762 | 11/014,724 | 11/014,723 | 11/014,756 | 11/014,736 | 11/014,759 |
| 11/014,758 | 11/014,725 | 11/014,739 | 11/014,738 | 11/014,737 | 11/014,726 | 11/014,745 |
| 11/014,712 | 7,270,405 | 7,303,268 | 11/014,735 | 11/014,734 | 11/014,719 | 11/014,750 |
| 11/014,749 | 7,249,833 | 11/758,640 | 11/775,143 | 11/838,877 | 11/944,453 | 11/944,633 |
| 11,955,065 | 11/014,769 | 11/014,729 | 11/014,743 | 11/014,733 | 7,300,140 | 11/014,755 |
| 11/014,765 | 11/014,766 | 11/014,740 | 7,284,816 | 7,284,845 | 7,255,430 | 11/014,744 |
| 11/014,741 | 11/014,768 | 11/014,767 | 11/014,718 | 11/014,717 | 11/014,716 | 11/014,732 |
| 11/014,742 | 11/097,268 | 11/097,185 | 11/097,184 | 11/778,567 | 11,852,958 | 11,852,907 |
| 11/872,038 | 11/955,093 | 11/961,578 | 11/293,820 | 11/293,813 | 11/293,822 | 11/293,812 |
| 11/293,821 | 11/293,814 | 11/293,793 | 11/293,842 | 11/293,811 | 11/293,807 | 11/293,806 |
| 11/293,805 | 11/293,810 | 11/688,863 | 11/688,864 | 11/688,865 | 11/688,866 | 11/688,867 |
| 11/688,868 | 11/688,869 | 11/688,871 | 11/688,872 | 11/688,873 | 11/741,766 | 11/482,982 |
| 11/482,983 | 11/482,984 | 11/495,818 | 11/495,819 | 11/677,049 | 11/677,050 | 11/677,051 |
| 11/872,719 | 11/872,718 | 11/014,722 | 11/934,781 | D528156 | 10/760,180 | 7,111,935 |
| 10/760,213 | 10/760,219 | 10/760,237 | 7,261,482 | 10/760,220 | 7,002,664 | 10/760,252 |
| 10/760,265 | 7,088,420 | 11/446,233 | 11/503,083 | 11/503,081 | 11/516,487 | 11/599,312 |
| 6,364,451 | 6,533,390 | 6,454,378 | 7,224,478 | 6,559,969 | 6,896,362 | 7,057,760 |
| 6,982,799 | 11/202,107 | 11/743,672 | 11/744,126 | 11/743,673 | 7,093,494 | 7,143,652 |
| 7,089,797 | 7,159,467 | 7,234,357 | 7,124,643 | 7,121,145 | 7,089,790 | 7,194,901 |
| 6,968,744 | 7,089,798 | 7,240,560 | 7,137,302 | 11/442,177 | 7,171,855 | 7,260,995 |
| 7,260,993 | 7,165,460 | 7,222,538 | 7,258,019 | 11/543,047 | 7,258,020 | 11/604,324 |
| 11/642,520 | 11/706,305 | 11/707,056 | 11/744,211 | 11/767,526 | 11/779,846 | 11/764,227 |
| 11/829,943 | 11/829,944 | 6,454,482 | 6,808,330 | 6,527,365 | 6,474,773 | 6,550,997 |
| 7,093,923 | 6,957,923 | 7,131,724 | 10/949,288 | 7,168,867 | 7,125,098 | 11/706,966 |
| 11/185,722 | 7,249,901 | 7,188,930 | 11/014,728 | 11/014,727 | D536031 | D531214 |
| 7,237,888 | 7,168,654 | 7,201,272 | 6,991,098 | 7,217,051 | 6,944,970 | 10/760,215 |
| 7,108,434 | 10/760,257 | 7,210,407 | 7,186,042 | 10/760,266 | 6,920,704 | 7,217,049 |

-continued

| | | | | | | |
|---|---|---|---|---|---|---|
| 10/760,214 | 10/760,260 | 7,147,102 | 7,287,828 | 7,249,838 | 10/760,241 | 10/962,413 |
| 10/962,427 | 7,261,477 | 7,225,739 | 10/962,402 | 10/962,425 | 10/962,428 | 7,191,978 |
| 10/962,426 | 10/962,409 | 10/962,417 | 10/962,403 | 7,163,287 | 7,258,415 | 10/962,523 |
| 7,258,424 | 10/962,410 | 7,195,412 | 7,207,670 | 7,270,401 | 7,220,072 | 11/474,267 |
| 11/544,547 | 11/585,925 | 11/593,000 | 11/706,298 | 11/706,296 | 11/706,327 | 11/730,760 |
| 11/730,407 | 11/730,787 | 11/735,977 | 11/736,527 | 11/753,566 | 11/754,359 | 11/778,061 |
| 11/765,398 | 11/778,556 | 11/829,937 | 11/780,470 | 11/866,399 | 11/223,262 | 11/223,018 |
| 11/223,114 | 11/955,366 | 11/223,022 | 11/223,021 | 11/223,020 | 11/223,019 | 11/014,730 |
| D541849 | 29/279,123 | 6,716,666 | 6,949,217 | 6,750,083 | 7,014,451 | 6,777,259 |
| 6,923,524 | 6,557,978 | 6,991,207 | 6,766,998 | 6,967,354 | 6,759,723 | 6,870,259 |
| 10/853,270 | 6,925,875 | 10/898,214 | 7,095,109 | 7,145,696 | 10/976,081 | 7,193,482 |
| 7,134,739 | 7,222,939 | 7,164,501 | 7,118,186 | 7,201,523 | 7,226,159 | 7,249,839 |
| 7,108,343 | 7,154,626 | 7,079,292 | 10/980,184 | 7,233,421 | 7,063,408 | 10/983,082 |
| 10/982,804 | 7,032,996 | 10/982,834 | 10/982,833 | 10/982,817 | 7,217,046 | 6,948,870 |
| 7,195,336 | 7,070,257 | 10/986,813 | 10/986,785 | 7,093,922 | 6,988,789 | 10/986,788 |
| 7,246,871 | 10/992,748 | 10/992,747 | 7,187,468 | 10/992,828 | 7,196,814 | 10/992,754 |
| 7,268,911 | 7,265,869 | 7,128,384 | 7,164,505 | 7,284,805 | 7,025,434 | 7,298,519 |
| 7,280,244 | 7,206,098 | 7,265,877 | 7,193,743 | 7,168,777 | 11/006,734 | 7,195,329 |
| 7,198,346 | 7,281,786 | 11/013,363 | 11/013,881 | 6,959,983 | 7,128,386 | 7,097,104 |
| 11/013,636 | 7,083,261 | 7,070,258 | 7,083,275 | 7,110,139 | 6,994,419 | 6,935,725 |
| 11/026,046 | 7,178,892 | 7,219,429 | 6,988,784 | 11/026,135 | 7,289,156 | 11/064,005 |
| 7,284,976 | 7,178,903 | 7,273,274 | 7,083,256 | 11/064,008 | 7,278,707 | 11/064,013 |
| 6,974,206 | 11/064,004 | 7,066,588 | 7,222,940 | 11/075,918 | 7,018,025 | 7,221,867 |
| 7,290,863 | 7,188,938 | 7,021,742 | 7,083,262 | 7,192,119 | 11/083,021 | 7,036,912 |
| 7,175,256 | 7,182,441 | 7,083,258 | 7,114,796 | 7,147,302 | 11/084,757 | 7,219,982 |
| 7,118,195 | 7,229,153 | 6,991,318 | 7,108,346 | 11/248,429 | 11/239,031 | 7,178,899 |
| 7,066,579 | 11/281,419 | 11/298,633 | 11/329,188 | 11/329,140 | 7,270,397 | 7,258,425 |
| 7,237,874 | 7,152,961 | 11/478,592 | 7,207,658 | 11/484,744 | 7,311,257 | 7,207,659 |
| 11/525,857 | 11/540,569 | 11/583,869 | 11/592,985 | 11/585,947 | 7,306,307 | 11/604,316 |
| 11/604,309 | 11/604,303 | 11/643,844 | 11/650,553 | 11/655,940 | 11/653,320 | 7,278,713 |
| 11/706,381 | 11/706,323 | 11/706,963 | 11/713,660 | 7,290,853 | 11/696,186 | 11/730,390 |
| 11/737,139 | 11/737,749 | 11/740,273 | 11/749,122 | 11/754,361 | 11/766,043 | 11/764,775 |
| 11/768,872 | 11/775,156 | 11/779,271 | 11/779,272 | 11/829,938 | 11/839,502 | 11/858,852 |
| 11/862,188 | 11/859,790 | 11/872,618 | 11/923,651 | 11/950,255 | 11/930,001 | 11/955,362 |
| 11/965,718 | 6,485,123 | 6,425,657 | 6,488,358 | 7,021,746 | 6,712,986 | 6,981,757 |
| 6,505,912 | 6,439,694 | 6,364,461 | 6,378,990 | 6,425,658 | 6,488,361 | 6,814,429 |
| 6,471,336 | 6,457,813 | 6,540,331 | 6,454,396 | 6,464,325 | 6,443,559 | 6,435,664 |
| 6,412,914 | 6,488,360 | 6,550,896 | 6,439,695 | 6,447,100 | 09/900,160 | 6,488,359 |
| 6,637,873 | 10/485,738 | 6,618,117 | 10/485,737 | 6,803,989 | 7,234,801 | 7,044,589 |
| 7,163,273 | 6,416,154 | 6,547,364 | 10/485,744 | 6,644,771 | 7,152,939 | 6,565,181 |
| 10/485,805 | 6,857,719 | 7,255,414 | 6,702,417 | 7,284,843 | 6,918,654 | 7,070,265 |
| 6,616,271 | 6,652,078 | 6,503,408 | 6,607,263 | 7,111,924 | 6,623,108 | 6,698,867 |
| 6,488,362 | 6,625,874 | 6,921,153 | 7,198,356 | 6,536,874 | 6,425,651 | 6,435,667 |
| 10/509,997 | 6,527,374 | 10/510,154 | 6,582,059 | 10/510,152 | 6,513,908 | 7,246,883 |
| 6,540,332 | 6,547,368 | 7,070,256 | 6,508,546 | 10/510,151 | 6,679,584 | 10/510,000 |
| 6,857,724 | 10/509,998 | 6,652,052 | 10/509,999 | 6,672,706 | 10/510,096 | 6,688,719 |
| 6,712,924 | 6,588,886 | 7,077,508 | 7,207,654 | 6,935,724 | 6,927,786 | 6,988,787 |
| 6,899,415 | 6,672,708 | 6,644,767 | 6,874,866 | 6,830,316 | 6,994,420 | 6,954,254 |
| 7,086,720 | 7,240,992 | 7,267,424 | 7,128,397 | 7,084,951 | 7,156,496 | 7,066,578 |
| 7,101,023 | 11/165,027 | 11/202,235 | 11/225,157 | 7,159,965 | 7,255,424 | 11/349,519 |
| 7,137,686 | 7,201,472 | 7,287,829 | 11/504,602 | 7,216,957 | 11/520,572 | 11/583,858 |
| 11/583,895 | 11/585,976 | 11/635,488 | 7,278,712 | 11/706,952 | 11/706,307 | 7,287,827 |
| 11/944,451 | 11/740,287 | 11/754,367 | 11/758,643 | 11/778,572 | 11/859,791 | 11/863,260 |
| 11/874,178 | 11/936,064 | 11/951,983 | 6,916,082 | 6,786,570 | 10/753,478 | 6,848,780 |
| 6,966,633 | 7,179,395 | 6,969,153 | 6,979,075 | 7,132,056 | 6,832,828 | 6,860,590 |
| 6,905,620 | 6,786,574 | 6,824,252 | 7,097,282 | 6,997,545 | 6,971,734 | 6,918,652 |
| 6,978,990 | 6,863,105 | 10/780,624 | 7,194,629 | 10/791,792 | 6,890,059 | 6,988,785 |
| 6,830,315 | 7,246,881 | 7,125,102 | 7,028,474 | 7,066,575 | 6,986,202 | 7,044,584 |
| 7,210,762 | 7,032,992 | 7,140,720 | 7,207,656 | 7,285,170 | 11/048,748 | 7,008,041 |
| 7,011,390 | 7,048,868 | 7,014,785 | 7,131,717 | 7,284,826 | 11/176,158 | 7,182,436 |
| 7,104,631 | 7,240,993 | 7,290,859 | 11/202,217 | 7,172,265 | 7,284,837 | 7,066,573 |
| 11/298,635 | 7,152,949 | 11/442,161 | 11/442,133 | 11/442,126 | 7,156,492 | 11/478,588 |
| 11/505,848 | 7,287,834 | 11/525,861 | 11/583,939 | 11/545,504 | 7,284,326 | 11/635,485 |
| 11/730,391 | 11/730,788 | 11/749,148 | 11/749,149 | 11/749,152 | 11/749,151 | 11/759,886 |
| 11/865,668 | 11/874,168 | 11/874,203 | 11/965,722 | 6,824,257 | 7,270,475 | 6,971,811 |
| 6,878,564 | 6,921,145 | 6,890,052 | 7,021,747 | 6,929,345 | 6,811,242 | 6,916,087 |
| 6,905,195 | 6,899,416 | 6,883,906 | 6,955,428 | 7,284,834 | 6,932,459 | 6,962,410 |
| 7,033,008 | 6,962,409 | 7,013,641 | 7,204,580 | 7,032,997 | 6,998,278 | 7,004,563 |
| 6,910,755 | 6,969,142 | 6,938,994 | 7,188,935 | 10/959,049 | 7,134,740 | 6,997,537 |
| 7,004,567 | 6,916,091 | 7,077,588 | 6,918,707 | 6,923,583 | 6,953,295 | 6,921,221 |
| 7,001,008 | 7,168,167 | 7,210,759 | 11/008,115 | 11/011,120 | 11/012,329 | 6,988,790 |
| 7,192,120 | 7,168,789 | 7,004,577 | 7,052,120 | 11/123,007 | 6,994,426 | 7,258,418 |
| 7,014,298 | 11/124,348 | 11/177,394 | 7,152,955 | 7,097,292 | 7,207,657 | 7,152,944 |
| 7,147,303 | 11/209,712 | 7,134,608 | 7,264,333 | 7,093,921 | 7,077,590 | 7,147,125 |
| 11/239,029 | 11/248,832 | 11/248,428 | 11/248,434 | 7,077,507 | 7,172,672 | 7,175,776 |
| 7,086,717 | 7,101,020 | 11/329,155 | 7,201,466 | 11/330,057 | 7,152,967 | 7,182,431 |
| 7,210,666 | 7,252,367 | 7,287,837 | 11/485,255 | 11/525,860 | 6,945,630 | 7,018,294 |
| 6,910,014 | 6,659,447 | 6,648,321 | 7,082,980 | 6,672,584 | 7,073,551 | 6,830,395 |
| 7,289,727 | 7,001,011 | 6,880,922 | 6,886,915 | 6,644,787 | 6,641,255 | 7,066,580 |

-continued

| | | | | | | |
|---|---|---|---|---|---|---|
| 6,652,082 | 7,284,833 | 6,666,544 | 6,666,543 | 6,669,332 | 6,984,023 | 6,733,104 |
| 6,644,793 | 6,723,575 | 6,953,235 | 6,663,225 | 7,076,872 | 7,059,706 | 7,185,971 |
| 7,090,335 | 6,854,827 | 6,793,974 | 10/636,258 | 7,222,929 | 6,739,701 | 7,073,881 |
| 7,155,823 | 7,219,427 | 7,008,503 | 6,783,216 | 6,883,890 | 6,857,726 | 10/636,274 |
| 6,641,256 | 6,808,253 | 6,827,428 | 6,802,587 | 6,997,534 | 6,959,982 | 6,959,981 |
| 6,886,917 | 6,969,473 | 6,827,425 | 7,007,859 | 6,802,594 | 6,792,754 | 6,860,107 |
| 6,786,043 | 6,863,378 | 7,052,114 | 7,001,007 | 10/729,151 | 10/729,157 | 6,948,794 |
| 6,805,435 | 6,733,116 | 10/683,006 | 7,008,046 | 6,880,918 | 7,066,574 | 6,983,595 |
| 6,923,527 | 7,275,800 | 7,163,276 | 7,156,495 | 6,976,751 | 6,994,430 | 7,014,296 |
| 7,059,704 | 7,160,743 | 7,175,775 | 7,287,839 | 7,097,283 | 7,140,722 | 11/123,009 |
| 11/123,008 | 7,080,893 | 7,093,920 | 7,270,492 | 7,128,093 | 7,052,113 | 7,055,934 |
| 11/155,627 | 7,278,796 | 11/159,197 | 7,083,263 | 7,145,592 | 7,025,436 | 11/281,444 |
| 7,258,421 | 11/478,591 | 11/478,735 | 7,226,147 | 11/482,940 | 7,195,339 | 11/503,061 |
| 11/505,938 | 7,284,838 | 7,293,856 | 11/544,577 | 11/540,576 | 11/585,964 | 11/592,991 |
| 11/599,342 | 11/600,803 | 11/604,321 | 11/604,302 | 11/635,535 | 11/635,486 | 11/643,842 |
| 11/655,987 | 11/650,541 | 11/706,301 | 11/707,039 | 11/730,388 | 11/730,786 | 11/730,785 |
| 11/739,080 | 11/764,746 | 11/768,875 | 11/779,847 | 11/829,940 | 11,847,240 | 11/834,625 |
| 11/863,210 | 11/865,680 | 11/874,156 | 11/923,602 | 11,951,940 | 11,954,988 | 11,961,662 |
| 7,067,067 | 6,776,476 | 6,880,914 | 7,086,709 | 6,783,217 | 7,147,791 | 6,929,352 |
| 7,144,095 | 6,820,974 | 6,918,647 | 6,984,016 | 7,192,125 | 6,824,251 | 6,834,939 |
| 6,840,600 | 6,786,573 | 7,144,519 | 6,799,835 | 6,959,975 | 6,959,974 | 7,021,740 |
| 6,935,718 | 6,938,983 | 6,938,991 | 7,226,145 | 7,140,719 | 6,988,788 | 7,022,250 |
| 6,929,350 | 7,011,393 | 7,004,566 | 7,175,097 | 6,948,799 | 7,143,944 | 7,310,157 |
| 7,029,100 | 6,957,811 | 7,073,724 | 7,055,933 | 7,077,490 | 7,055,940 | 10/991,402 |
| 7,234,645 | 7,032,999 | 7,066,576 | 7,229,150 | 7,086,728 | 7,246,879 | 7,284,825 |
| 7,140,718 | 7,284,817 | 7,144,098 | 7,044,577 | 7,284,824 | 7,284,827 | 7,189,334 |
| 7,055,935 | 7,152,860 | 11/203,188 | 11/203,173 | 11/202,343 | 7,213,989 | 11/225,156 |
| 11/225,173 | 7,300,141 | 7,114,868 | 7,168,796 | 7,159,967 | 11/272,425 | 7,152,805 |
| 11/298,530 | 11/330,061 | 7,133,799 | 11/330,054 | 11/329,284 | 7,152,956 | 7,128,399 |
| 7,147,305 | 7,287,702 | 11/442,160 | 7,246,884 | 7,152,960 | 11/442,125 | 11/454,901 |
| 11/442,134 | 11/450,441 | 11/474,274 | 11/499,741 | 7,270,399 | 6,857,728 | 6,857,729 |
| 6,857,730 | 6,989,292 | 7,126,216 | 6,977,189 | 6,982,189 | 7,173,332 | 7,026,176 |
| 6,979,599 | 6,812,062 | 6,886,751 | 10/804,057 | 10/804,036 | 7,001,793 | 6,866,369 |
| 6,946,743 | 10/804,048 | 6,886,918 | 7,059,720 | 10/846,561 | 10/846,562 | 10/846,647 |
| 10/846,649 | 10/846,627 | 6,951,390 | 6,981,765 | 6,789,881 | 6,802,592 | 7,029,097 |
| 6,799,836 | 7,048,352 | 7,182,267 | 7,025,279 | 6,857,571 | 6,817,539 | 6,830,198 |
| 6,992,791 | 7,038,809 | 6,980,323 | 7,148,992 | 7,139,091 | 6,947,173 | 7,101,034 |
| 6,969,144 | 6,942,319 | 6,827,427 | 6,984,021 | 6,984,022 | 6,869,167 | 6,918,542 |
| 7,007,852 | 6,899,420 | 6,918,665 | 6,997,625 | 6,988,840 | 6,984,080 | 6,845,978 |
| 6,848,687 | 6,840,512 | 6,863,365 | 7,204,582 | 6,921,150 | 7,128,396 | 6,913,347 |
| 7,008,819 | 6,935,736 | 6,991,317 | 7,284,836 | 7,055,947 | 7,093,928 | 7,100,834 |
| 7,270,396 | 7,187,086 | 7,290,856 | 7,032,825 | 7,086,721 | 7,159,968 | 7,010,456 |
| 7,147,307 | 7,111,925 | 11/144,812 | 7,229,154 | 11/505,849 | 11/520,570 | 11/520,575 |
| 11/546,437 | 11/540,575 | 11/583,937 | 7,278,711 | 7,290,720 | 11/592,207 | 11/635,489 |
| 11/604,319 | 11/635,490 | 11/635,525 | 7,287,706 | 11/706,366 | 11/706,310 | 11/706,308 |
| 11/785,108 | 11/744,214 | 11/744,218 | 11,748,485 | 11/748,490 | 11/764,778 | 11/766,025 |
| 11/834,635 | 11/839,541 | 11,860,420 | 11/865,693 | 11/863,118 | 11/866,307 | 11/866,340 |
| 11/869,684 | 11/869,722 | 11/869,694 | 11/876,592 | 11/945,244 | 11,951,121 | 11/945,238 |
| 11,955,358 | 11,965,710 | 11,962,050 | | | | |

BACKGROUND

The Applicant has previously described a method of enabling users to access information from a computer system via a printed substrate e.g. paper. The substrate has coded data printed thereon, which is read by an optical sensing device when the user interacts with the substrate using the sensing device. A computer receives interaction data from the sensing device and uses this data to determine what action is being requested by the user. For example, a user may make handwritten input onto a form or make a selection gesture around a printed item. This input is interpreted by the computer system with reference to a page description corresponding to the printed substrate.

It would be desirable to improve to enable the sensing device to read standard linear barcodes without special modifications or selection of a special barcode-reading mode by the user.

SUMMARY OF INVENTION

In a first aspect the present invention provides a method of recovering a waveform representing a linear bar code, the method including the steps of:

moving a sensing device relative to the barcode, said sensing device having a two-dimensional image sensor;

capturing, using the image sensor, a plurality of two-dimensional partial images of said bar code during said movement;

determining, from at least one of the images, a direction substantially perpendicular to the bars of the bar code;

determining, substantially along the direction, a waveform fragment corresponding to each captured image;

determining an alignment between each pair of successive waveform fragments; and recovering, from the aligned waveform fragments, the waveform.

Optionally, a field of view of the image sensor is smaller than the length of the bar code.

Optionally, each partial two-dimensional image of said bar code contains a plurality of bars.

In a further aspect there is provided a method further comprising the step of:

determining a product code by decoding the waveform.

In a further aspect there is provided a method further comprising the step of:

low-pass filtering the captured images in a direction substantially parallel to the bars.

Optionally, the direction is determined using a Hough transform for identifying an orientation of edges in the at least one image.

Optionally, the alignment between each pair of successive waveform fragments is determined by performing one or more normalized cross-correlations between each pair.

Optionally, the waveform is recovered from the aligned waveform fragments by appending each fragment to a previous fragment, and skipping a region overlapping with said previous fragment.

Optionally, the waveform is recovered from the aligned waveform fragments by:

determining an average value for a plurality of sample values of the waveform, said sample values being contained in portions of the waveform contained in overlapping waveform fragments.

Optionally, the average value is a weighted average, whereby sample values captured from a centre portion of each image have a higher weight than sample values captured from an edge portion of each image.

Optionally, the sample values for each image are weighted in accordance with a Gaussian window for said image.

Optionally, the waveform is recovered from the aligned waveform fragments by:

aligning a current waveform fragment with a partially-constructed waveform constructed using all waveform fragments up to the current fragment.

Optionally, said method is performed only in the absence of a location-indicating tag in a field of view of the image sensor.

In another aspect the present invention provides a sensing device for recovering a waveform representing a linear bar code, said sensing device comprising:

a two-dimensional image sensor for capturing a plurality of partial two-dimensional images of said bar code during movement of said sensing device relative to said bar code; and a processor configured for:

determining, from at least one of the images, a direction substantially perpendicular to the bars of the bar code;

determining, substantially along the direction, a waveform fragment corresponding to each captured image;

determining an alignment between each pair of successive waveform fragments; and recovering, from the aligned waveform fragments, the waveform.

Optionally, a field of view of the image sensor is smaller than the length of the bar code.

Optionally, a field of view of the image sensor is sufficiently large for capturing an image of a plurality of bars.

Optionally, the processor is further configured for:

determining the alignment between each pair of successive waveform fragments by performing one or more normalized cross-correlations between each pair.

Optionally, the processor is further configured for:

determining an average value for a plurality of sample values of the waveform, said sample values being contained in portions of the waveform contained in overlapping waveform fragments.

In a further aspect there is provided a sensing device further comprising:

communication means for communicating the waveform to a computer system.

Optionally, said image sensor has a field of view sufficiently large for capturing an image of a whole location-indicating tag disposed on a surface, and said processor is configured for determining a position of the sensing device relative to the surface using the imaged tag.

BRIEF DESCRIPTION OF DRAWINGS

Preferred and other embodiments of the invention will now be described, by way of non-limiting example only, with reference to the accompanying drawings, in which.

DETAILED DESCRIPTION OF PREFERRED AND OTHER EMBODIMENTS

Figure 1:
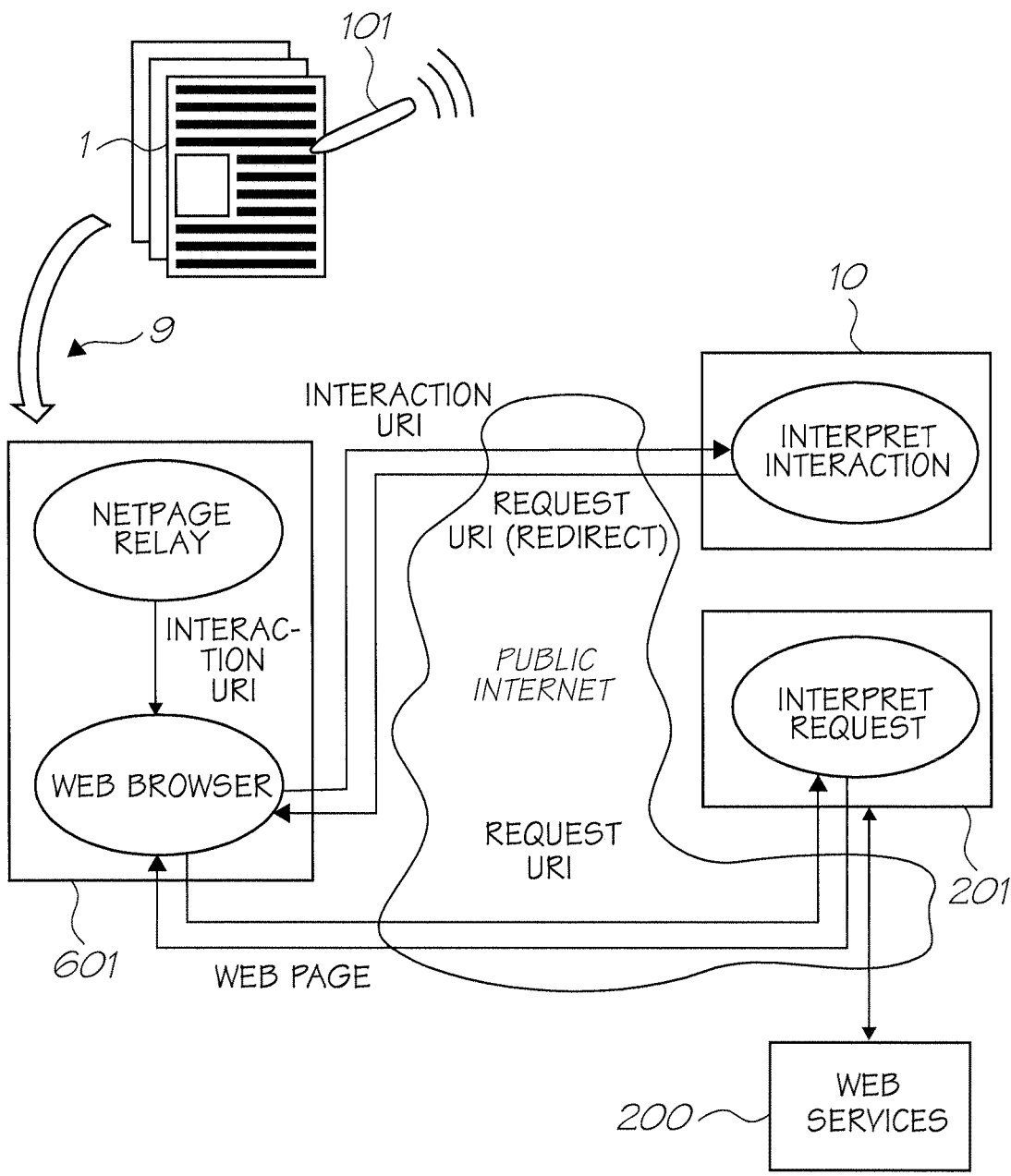
FIG. 1 shows an embodiment of basic netpage architecture.

Note: Memjet™ is a trade mark of Silverbrook Research Pty Ltd, Australia.

In the preferred embodiment, the invention is configured to work with the netpage networked computer system, a detailed overview of which follows. It will be appreciated that not every implementation will necessarily embody all or even most of the specific details and extensions discussed below in relation to the basic system. However, the system is described in its most complete form to reduce the need for external reference when attempting to understand the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive webpages. Information is encoded on each page using ink which is substantially invisible to the unaided human eye. The ink, however, and thereby the coded data, can be sensed by an optically imaging sensing device and transmitted to the netpage system. The sensing device may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). References herein to "pen" or "netpage pen" are provided by way of example only. It will, of course, be appreciated that the pen may take the form of any of the sensing devices described above.

In one embodiment, active buttons and hyperlinks on each page can be clicked with the sensing device to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized. In other embodiments, text on a netpage may be clicked or gestured to initiate a search based on keywords indicated by the user.

Figure 2:
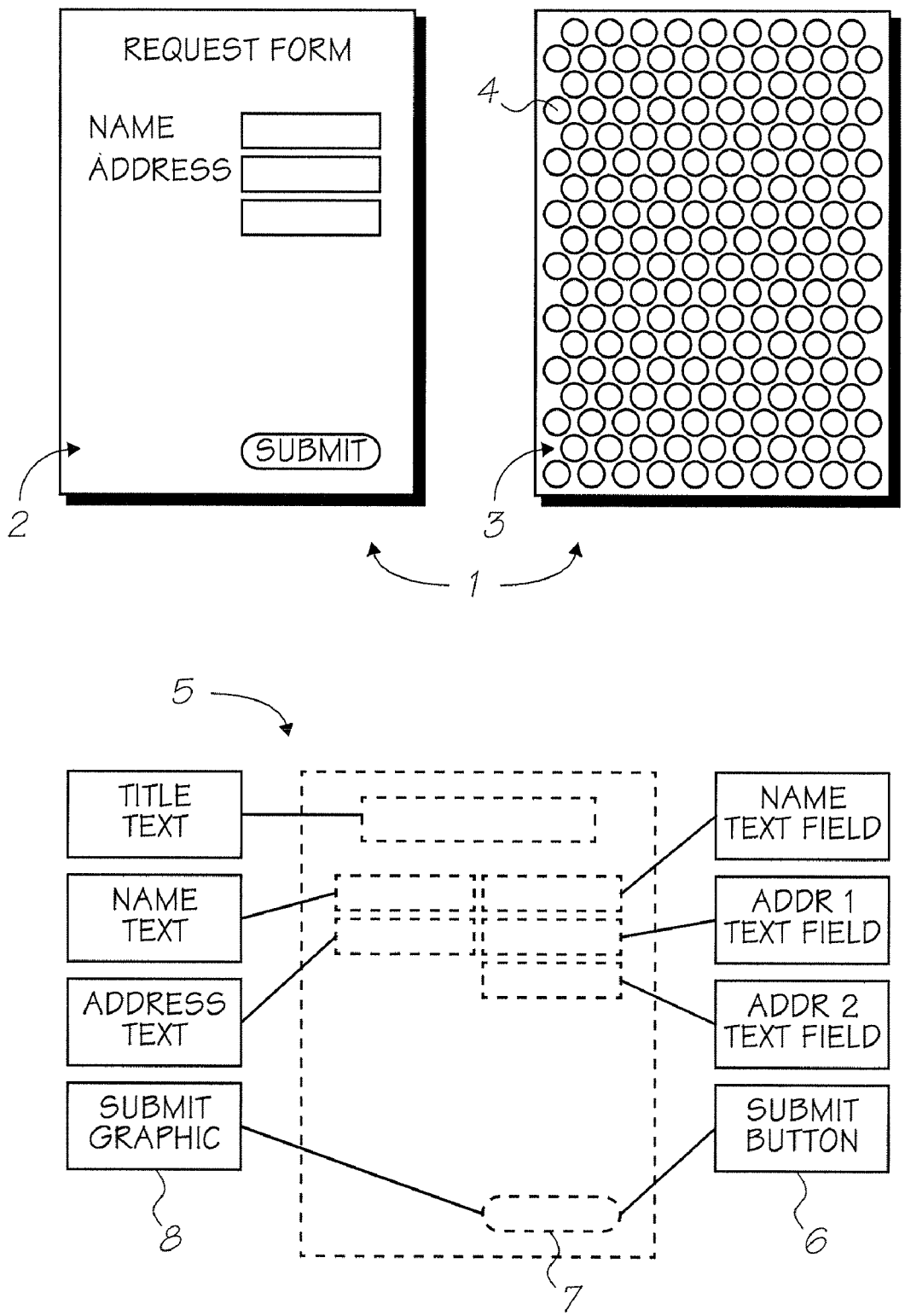
FIG. 2 is a schematic of a the relationship between a sample printed netpage and its online page description.

As illustrated in FIG. 2, a printed netpage 1 can represent an interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 3:
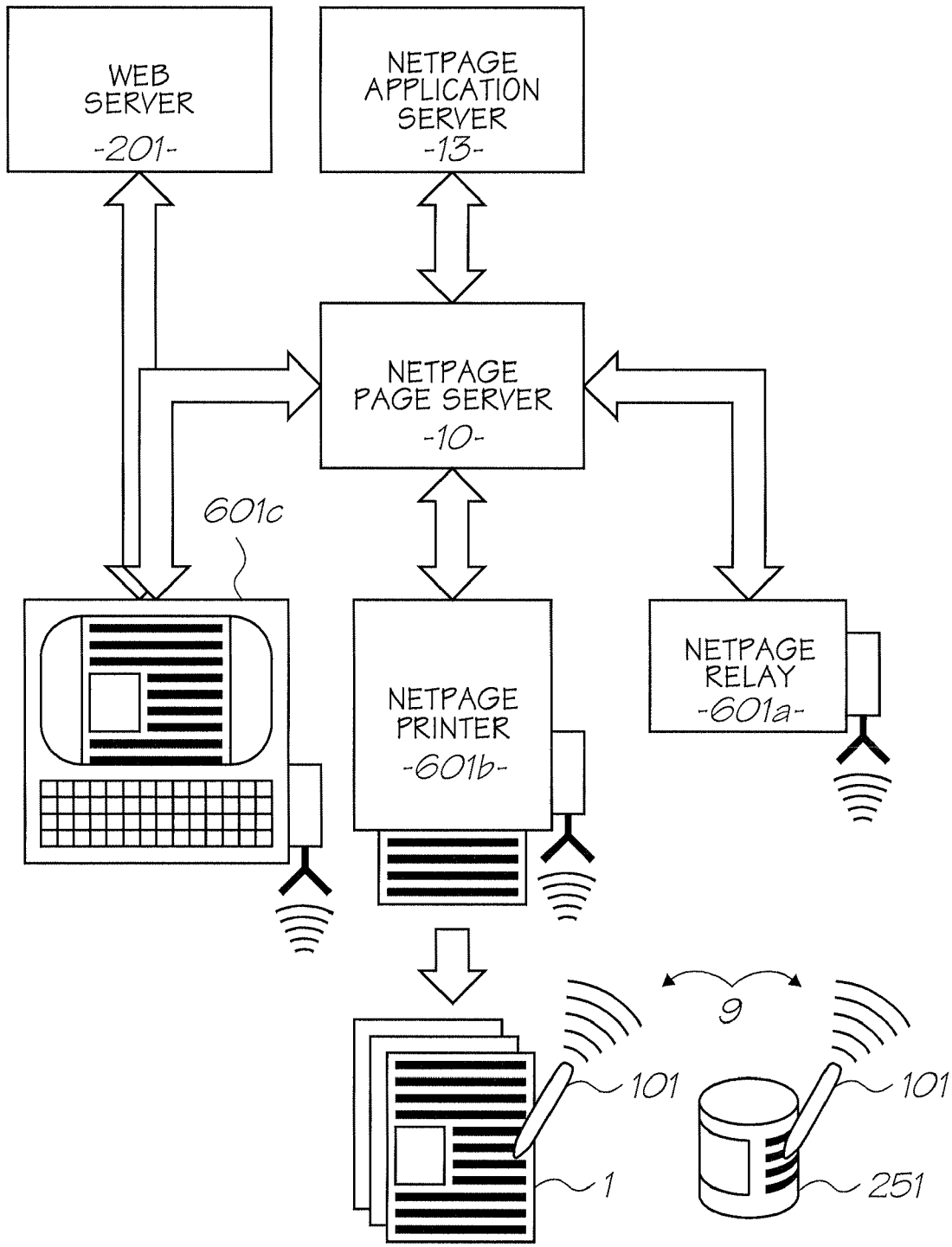
FIG. 3 shows an embodiment of basic netpage architecture with various alternatives for the relay device.
Figure 3A:
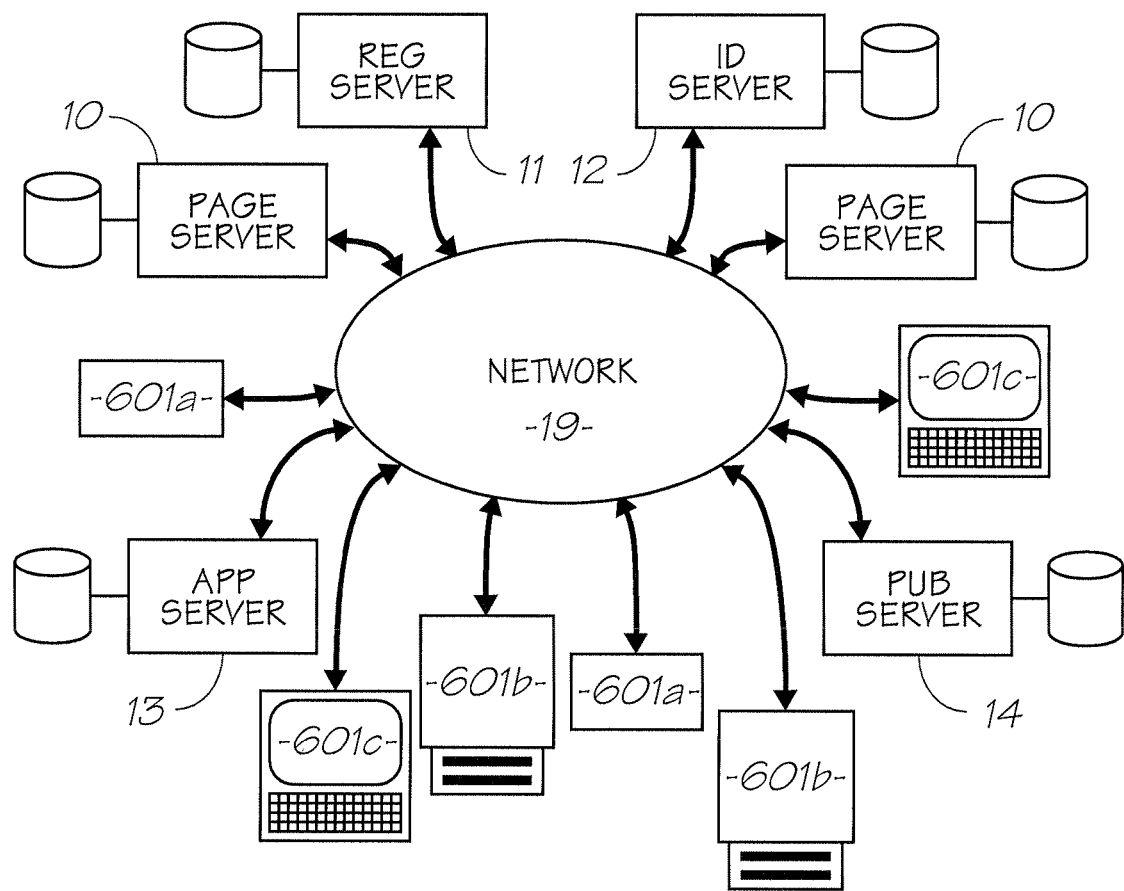
FIG. 3A illustrates a collection of netpage servers, Web terminals, printers and relays interconnected via a network.

As illustrated in FIGS. 1 and 3, a netpage sensing device 101, such as the pen shown in FIGS. 8 and 9 and described in more detail below, works in conjunction with a netpage relay device 601, which is an Internet-connected device for home, office or mobile use. The pen is wireless and communicates securely with the netpage relay device 601 via a short-range radio link 9. In an alternative embodiment, the netpage pen 101 utilises a wired connection, such as a USB or other serial connection, to the relay device 601.

The relay device 601 performs the basic function of relaying interaction data to a page server 10, which interprets the interaction data. As shown in FIG. 3, the relay device 601 may, for example, take the form of a personal computer 601a, a netpage printer 601b or some other relay 601c.

The netpage printer 601b is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions. Netpages printed on-demand at their point of consumption combine the ease-of-use of paper with the timeliness and interactivity of an interactive medium.

Alternatively, the netpage relay device 601 may be a portable device, such as a mobile phone or PDA, a laptop or desktop computer, or an information appliance connected to a shared display, such as a TV. If the relay device 601 is not a netpage printer 601b which prints netpages digitally and on demand, the netpages may be printed by traditional analog printing presses, using such techniques as offset lithography, flexography, screen printing, relief printing and rotogravure, as well as by digital printing presses, using techniques such as drop-on-demand inkjet, continuous inkjet, dye transfer, and laser printing.

As shown in FIG. 3, the netpage sensing device 101 interacts with the coded data on a printed netpage 1, or other printed substrate such as a label of a product item 251, and communicates, via a short-range radio link 9, the interaction to the relay 601. The relay 601 sends corresponding interaction data to the relevant netpage page server 10 for interpretation. Raw data received from the sensing device 101 may be relayed directly to the page server 10 as interaction data. Alternatively, the interaction data may be encoded in the form of an interaction URI and transmitted to the page server 10 via a user's web browser. Of course, the relay device 601 (e.g. mobile phone) may incorporate a web browser and a display device.

Interpretation of the interaction data by the page server 10 may result in direct access to information requested by the user. This information may be sent from the page server 10 to, for example, a user's display device (e.g. a display device associated with the relay device 601). The information sent to the user may be in the form of a webpage constructed by the page server 10 and the webpage may be constructed using information from external web services 200 (e.g. search engines) or local web resources accessible by the page server 10. In some circumstances, the page server 10 may access application computer software running on a netpage application server 13.

Alternatively, and as shown explicitly in FIG. 1, a two-step information retrieval process may be employed. Interaction data is sent from the sensing device 101 to the relay device 601 in the usual way. The relay device 601 then sends the interaction data to the page server 10 for interpretation with reference to the relevant page description 5. Then, the page server 10 forms a request (typically in the form of a request URI) and sends this request URI back to the user's relay device 601. A web browser running on the relay device 601 then sends the request URI to a netpage web server 201, which interprets the request. The netpage web server 201 may interact with local web resources and external web services 200 to interpret the request and construct a webpage. Once the webpage has been constructed by the netpage web server 201, it is transmitted to the web browser running on the user's relay device 601, which typically displays the webpage. This system architecture is particularly useful for performing searching via netpages, as described in our earlier U.S. patent application Ser. No. 11/672,950 filed on Feb. 8, 2007 (the contents of which is incorporated by reference). For example, the request URI may encode search query terms, which are searched via the netpage web server 201.

The netpage relay device 601 can be configured to support any number of sensing devices, and a sensing device can work with any number of netpage relays. In the preferred implementation, each netpage sensing device 101 has a unique identifier. This allows each user to maintain a distinct profile with respect to a netpage page server 10 or application server 13.

Digital, on-demand delivery of netpages 1 may be performed by the netpage printer 601b, which exploits the growing availability of broadband Internet access. Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage pen may be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. One version of the netpage pen includes fingerprint scanning, verified in a similar way by the netpage registration server.

Netpage System Architecture

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. The UML does not directly support second-order modelling—i.e. classes of classes.

Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled.

An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line.

A generalization relationship ("is-a") is drawn as a solid line joining two classes, with an arrow (in the form of an open triangle) at the generalization end.

When a class diagram is broken up into multiple diagrams, any class which is duplicated is shown with a dashed outline in all but the main diagram which defines it. It is shown with attributes only where it is defined.

1 Netpages

Netpages are the foundation on which a netpage network is built. They provide a paper-based user interface to published information and interactive services.

A netpage consists of a printed page (or other surface region) invisibly tagged with references to an online description of the page. The online page description is maintained persistently by the netpage page server 10. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages (for example, those printed by analog printing presses) can share the same page description. However, to allow input through otherwise identical pages to be distinguished, each netpage may be assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are typically printed in infrared-absorptive ink on any substrate which is infrared-reflective, such as ordinary paper, or in infrared fluorescing ink. Near-infrared wavelengths are invisible to the human eye but are easily sensed by a solid-state image sensor with an appropriate filter.

A tag is sensed by a 2D area image sensor in the netpage sensing device, and the tag data is transmitted to the netpage system via the nearest netpage relay device. The pen is wireless and communicates with the netpage relay device via a short-range radio link. Tags are sufficiently small and densely arranged that the sensing device can reliably image at least one tag even on a single click on the page. It is important that the pen recognize the page ID and position on every interaction with the page, since the interaction is stateless. Tags are error-correctably encoded to make them partially tolerant to surface damage.

The netpage page server 10 maintains a unique page instance for each unique printed netpage, allowing it to maintain a distinct set of user-supplied values for input fields in the page description for each printed netpage.

Figure 4:
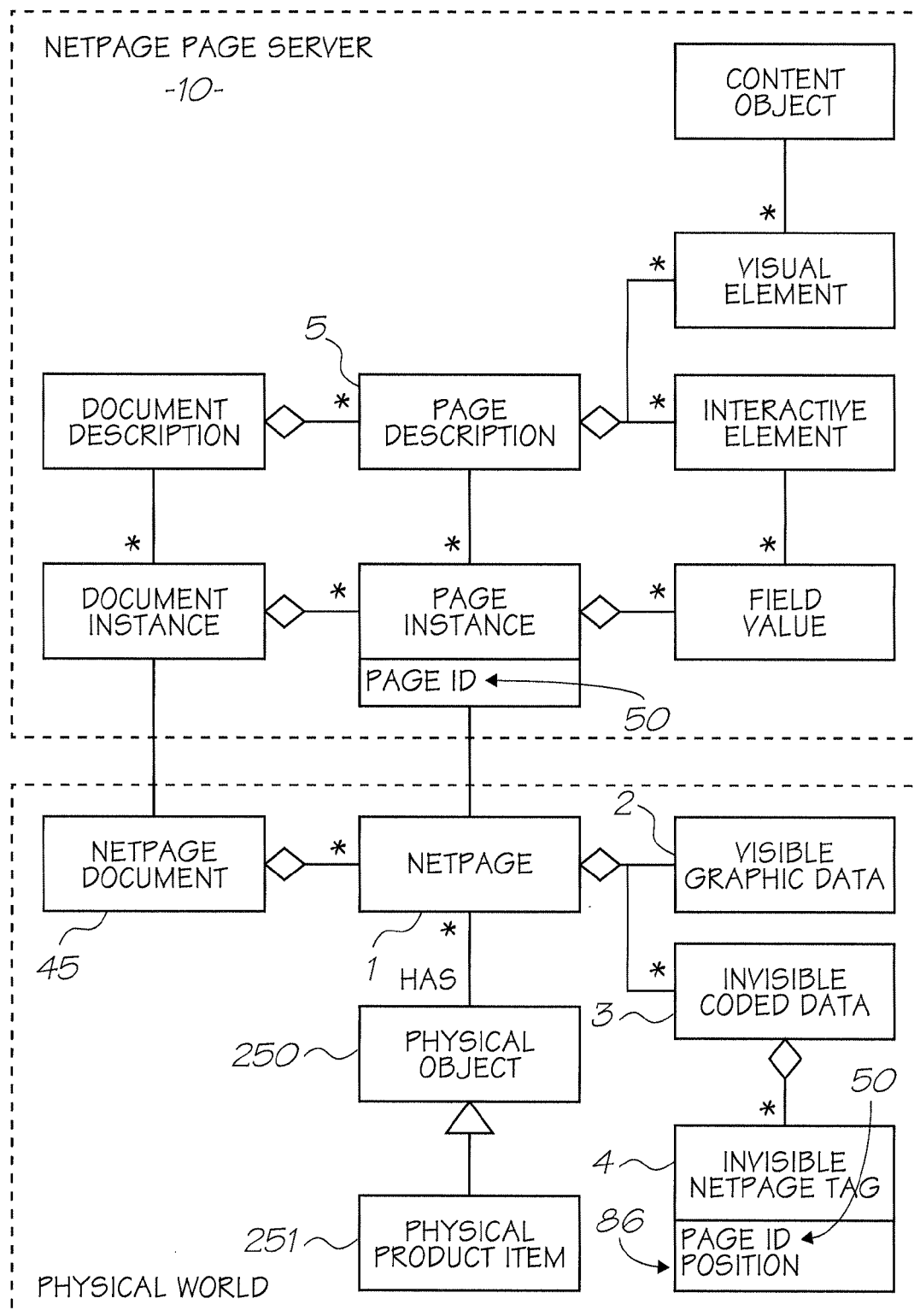
FIG. 4 is a schematic view of a high-level structure of a printed netpage and its online page description.

The relationship between the page description, the page instance, and the printed netpage is shown in FIG. 4. The printed netpage may be part of a printed netpage document 45. The page instance may be associated with both the netpage printer which printed it and, if known, the netpage user who requested it.

2 Netpage Tags

2.1 Tag Data Content

In a preferred form, each tag identifies the region in which it appears, and the location of that tag within the region and an orientation of the tag relative to a substrate on which the tag is printed. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

As will be more clearly explained below, in a preferred embodiment, each tag typically contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

TABLE 1

Tag data

| Field | Precision (bits) |
|---|---|
| Page ID/Region ID | 100 |
| Tag ID/x-y coordinates | 16 |
| Flags | 4 |
| Total | 120 |

Each tag contains 120 bits of information, typically allocated as shown in Table 1. Assuming a maximum tag density of 64 per square inch, a 16-bit tag ID supports a region size of up to 1024 square inches. Larger regions can be mapped continuously without increasing the tag ID precision simply by using abutting regions and maps. The 100-bit region ID allows $2^{100}$ (~$10^{30}$ or a million trillion trillion) different regions to be uniquely identified.

2.2 Tag Data Encoding

The 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword.

Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

2.3 Physical Tag Structure

Figure 5A:
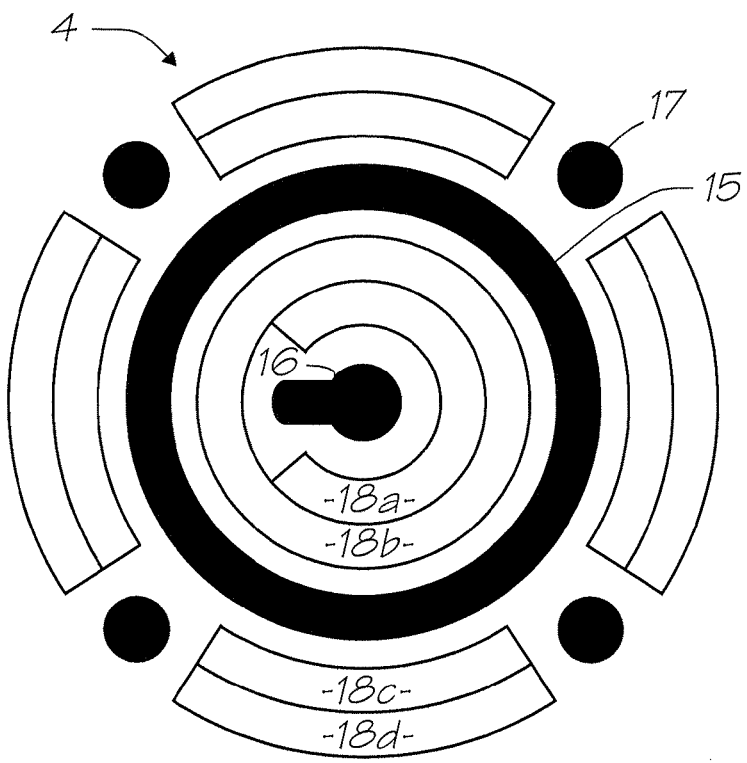
FIG. 5A is a plan view showing a structure of a netpage tag.

The physical representation of the tag, shown in FIG. 5a, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data.

To achieve proper tag reproduction, the tag is rendered at a resolution of 256×256 dots. When printed at 1600 dots per inch this yields a tag with a diameter of about 4 mm. At this resolution the tag is designed to be surrounded by a "quiet area" of radius 16 dots. Since the quiet area is also contributed by adjacent tags, it only adds 16 dots to the effective diameter of the tag.

The tag may include a plurality of target structures. A detection ring 15 allows the sensing device to initially detect the tag. The ring is easy to detect because it is rotationally invariant and because a simple correction of its aspect ratio removes most of the effects of perspective distortion. An orientation axis 16 allows the sensing device to determine the approximate planar orientation of the tag due to the yaw of the sensor. The orientation axis is skewed to yield a unique orientation. Four perspective targets 17 allow the sensing device to infer an accurate two-dimensional perspective transform of the tag and hence an accurate three-dimensional position and orientation of the tag relative to the sensor.

All target structures are redundantly large to improve their immunity to noise.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags.

Figure 5B:
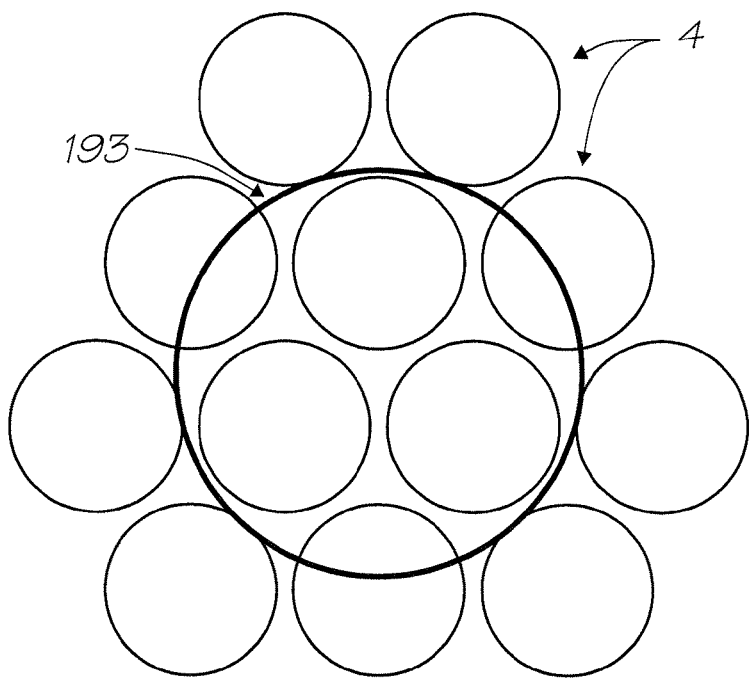
FIG. 5B is a plan view showing a relationship between a set of the tags shown in FIG. 5*a* and a field of view of a netpage sensing device in the form of a netpage pen.

Thus, if a tag has a circular shape, the minimum diameter of the sensor field of view is obtained when the tags are tiled on a equilateral triangular grid, as shown in FIG. 5b.

2.4 Tag Image Processing and Decoding

Figure 7:
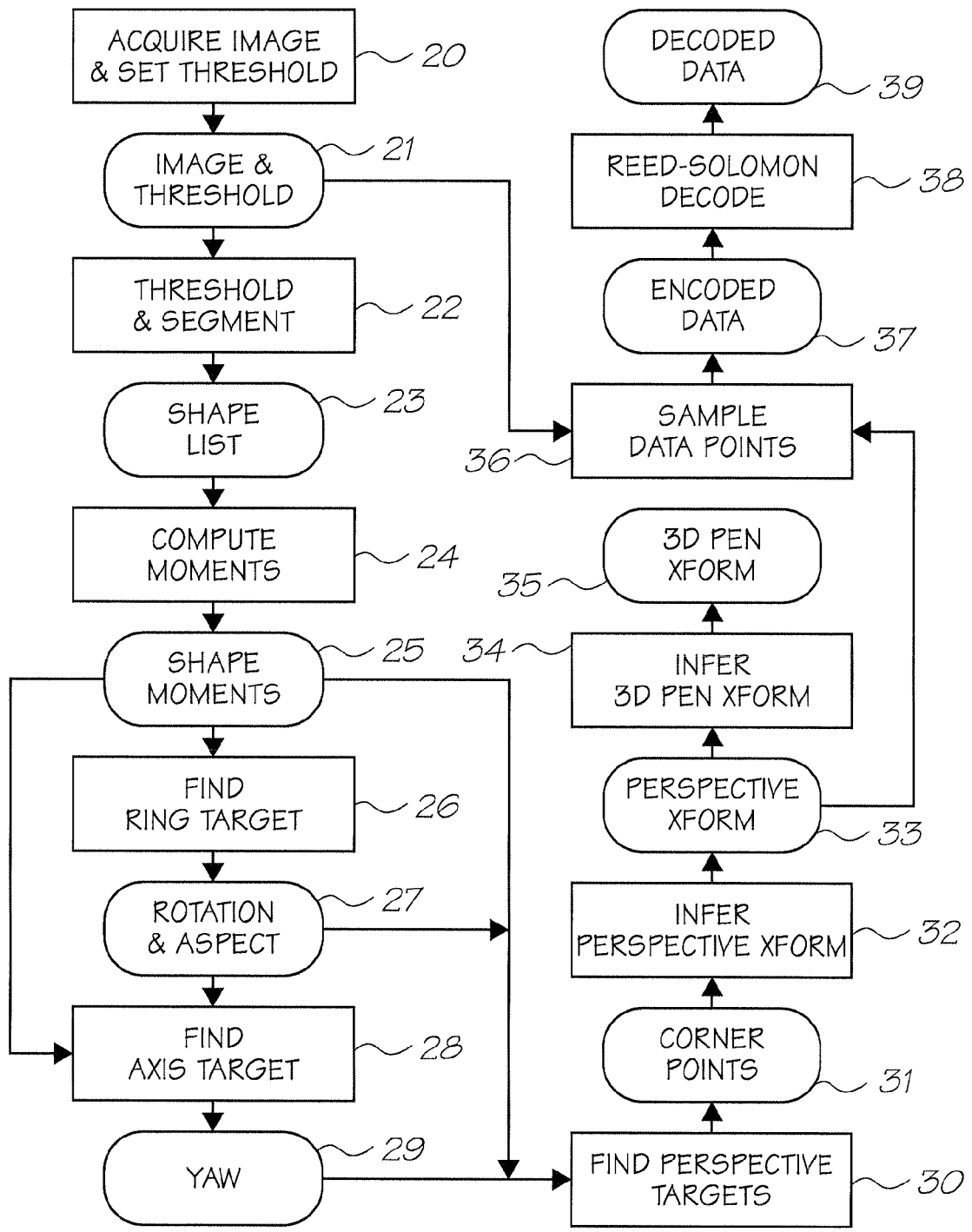
FIG. 7 is a flowchart of a tag image processing and decoding algorithm.

The tag image processing and decoding performed by a sensing device such as the netpage pen is shown in FIG. 7. While a captured image is being acquired from the image sensor, the dynamic range of the image is determined (at 20). The center of the range is then chosen as the binary threshold for the image 21. The image is then thresholded and segmented into connected pixel regions (i.e. shapes 23) (at 22).

Shapes which are too small to represent tag target structures are discarded. The size and centroid of each shape is also computed.

Binary shape moments 25 are then computed (at 24) for each shape, and these provide the basis for subsequently locating target structures. Central shape moments are by their nature invariant of position, and can be easily made invariant of scale, aspect ratio and rotation.

The ring target structure 15 is the first to be located (at 26). A ring has the advantage of being very well behaved when perspective-distorted. Matching proceeds by aspect-normalizing and rotation-normalizing each shape's moments. Once its second-order moments are normalized the ring is easy to recognize even if the perspective distortion was significant. The ring's original aspect and rotation 27 together provide a useful approximation of the perspective transform.

The axis target structure 16 is the next to be located (at 28). Matching proceeds by applying the ring's normalizations to each shape's moments, and rotation-normalizing the resulting moments. Once its second-order moments are normalized the axis target is easily recognized. Note that one third order moment is required to disambiguate the two possible orientations of the axis. The shape is deliberately skewed to one side to make this possible. Note also that it is only possible to rotation-normalize the axis target after it has had the ring's normalizations applied, since the perspective distortion can hide the axis target's axis. The axis target's original rotation provides a useful approximation of the tag's rotation due to pen yaw 29.

The four perspective target structures 17 are the last to be located (at 30). Good estimates of their positions are computed based on their known spatial relationships to the ring and axis targets, the aspect and rotation of the ring, and the rotation of the axis. Matching proceeds by applying the ring's normalizations to each shape's moments. Once their second-order moments are normalized the circular perspective targets are easy to recognize, and the target closest to each estimated position is taken as a match. The original centroids of the four perspective targets are then taken to be the perspective-distorted corners 31 of a square of known size in tag space, and an eight-degree-of-freedom perspective transform 33 is inferred (at 32) based on solving the well-understood equations relating the four tag-space and image-space point pairs (see Heckbert, P., Fundamentals of Texture Mapping and Image Warping, Masters Thesis, Dept. of EECS, U. of California at Berkeley, Technical Report No. UCB/CSD 89/516, June 1989, the contents of which are herein incorporated by cross-reference).

The inferred tag-space to image-space perspective transform is used to project (at 36) each known data bit position in tag space into image space where the real-valued position is used to bilinearly interpolate (at 36) the four relevant adjacent pixels in the input image. The previously computed image threshold 21 is used to threshold the result to produce the final bit value 37.

Once all 360 data bits 37 have been obtained in this way, each of the six 60-bit Reed-Solomon codewords is decoded (at 38) to yield 20 decoded bits 39, or 120 decoded bits in total. Note that the codeword symbols are sampled in codeword order, so that codewords are implicitly de-interleaved during the sampling process.

The ring target 15 is only sought in a subarea of the image whose relationship to the image guarantees that the ring, if found, is part of a complete tag. If a complete tag is not found and successfully decoded, then no pen position is recorded for the current frame. Given adequate processing power and ideally a non-minimal field of view 193, an alternative strategy involves seeking another tag in the current image.

The obtained tag data indicates the identity of the region containing the tag and the position of the tag within the region. An accurate position 35 of the pen nib in the region, as well as the overall orientation 35 of the pen, is then inferred (at 34) from the perspective transform 33 observed on the tag and the known spatial relationship between the image sensor (containing the optical axis of the pen) and the nib (which typically contains the physical axis of the pen). The image sensor is usually offset from the nib.

2.5 Alternative Tag Structures

The tag structure described above is designed to support the tagging of non-planar surfaces where a regular tiling of tags may not be possible. In the more usual case of planar surfaces where a regular tiling of tags is possible, i.e. surfaces such as sheets of paper and the like, more efficient tag structures can be used which exploit the regular nature of the tiling.

Figure 6A:
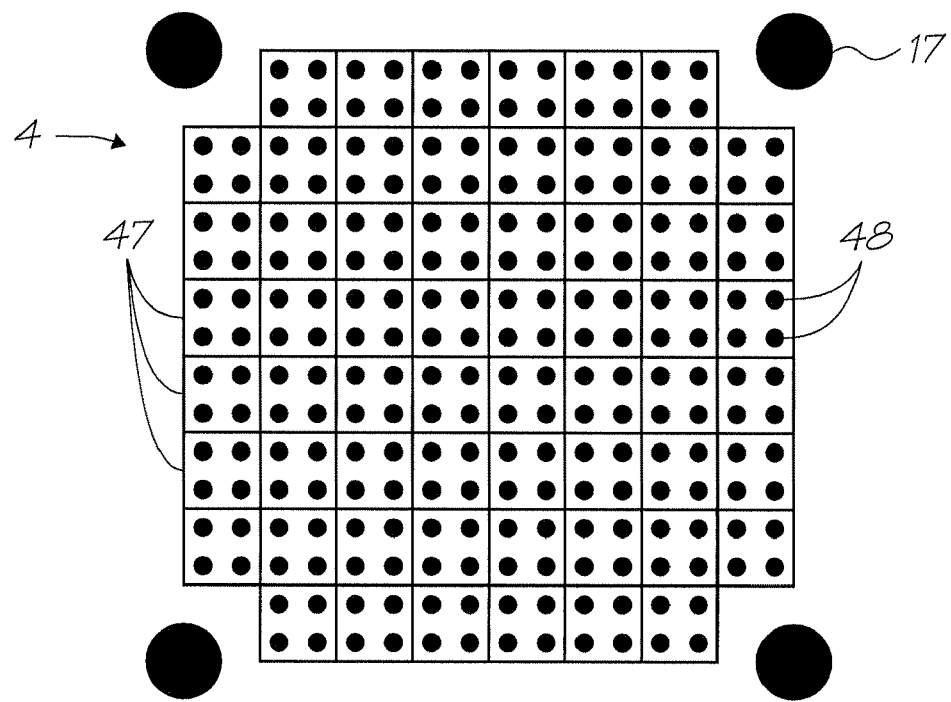
FIG. 6A is a plan view showing an alternative structure of a netpage tag.
Figure 6B:
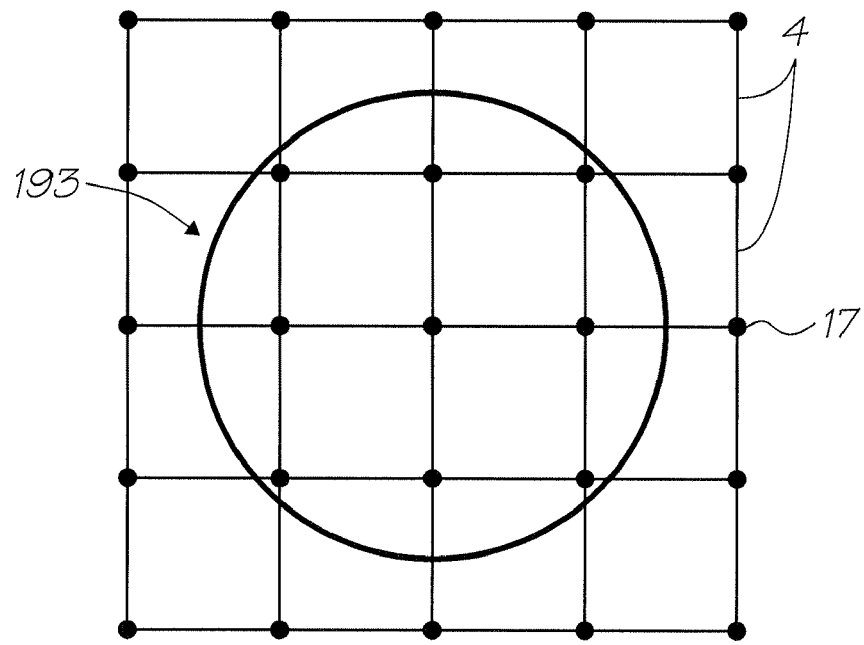
FIG. 6B is a plan view showing a relationship between a set of the tags shown in FIG. 6*a* and a field of view of a netpage sensing device in the form of a netpage pen.
Figures 6C, 6D:
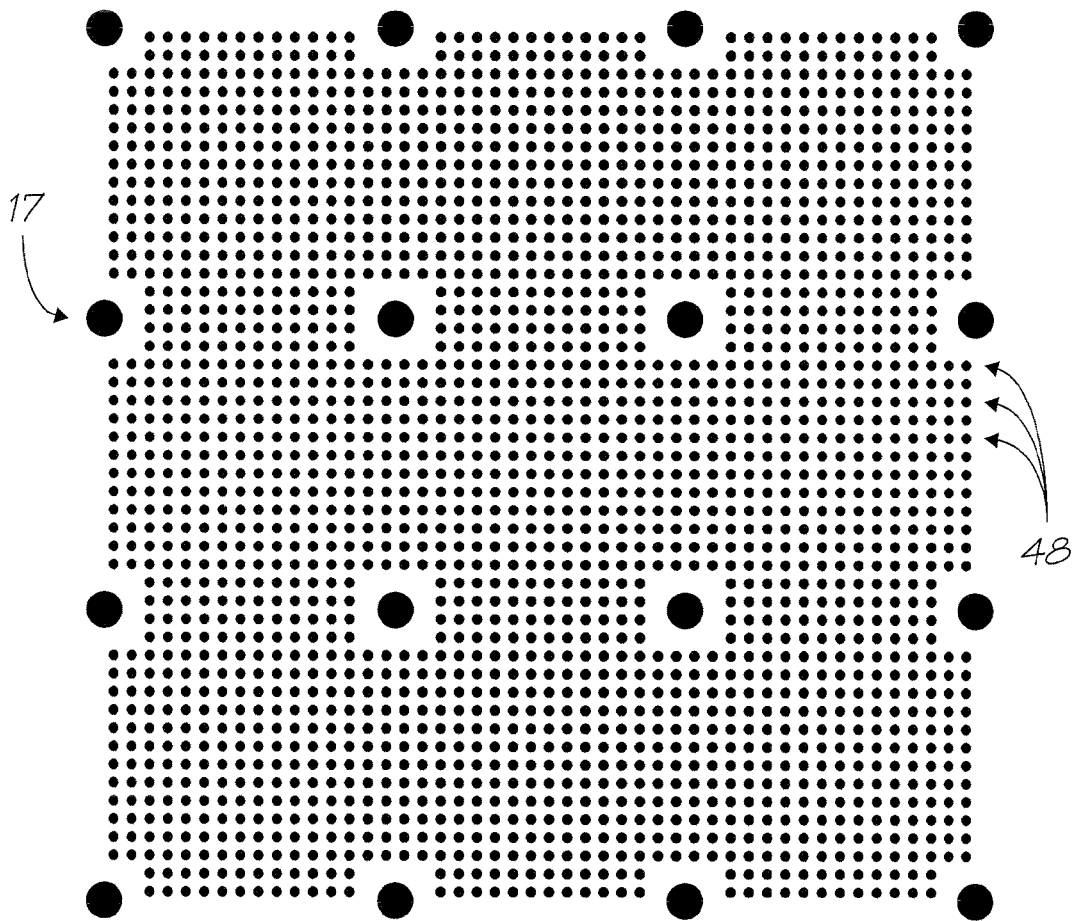
FIG. 6C is a plan view showing an arrangement of nine of the tags shown in FIG. 6*a* where targets are shared between adjacent tags.
FIG. 6D is a plan view showing the interleaving and rotation of the symbols of the four codewords of the tag shown in FIG. 6*a;*

FIG. 6*a* shows a square tag 4 with four perspective targets 17. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 6*b* and 6*c*. FIG. 6*b* shows a square tiling of 16 tags and the corresponding minimum field of view 193, which must span the diagonals of two tags. FIG. 6*c* shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits.

The data-bearing dots 48 of the tag are designed to not overlap their neighbors, so that groups of tags cannot produce structures which resemble targets. This also saves ink. The perspective targets therefore allow detection of the tag, so further targets are not required. Tag image processing proceeds as described in section 1.2.4 above, with the exception that steps 26 and 28 are omitted.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 6*d*, where each symbol is labelled with the number of its codeword (1-4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Additional tag structures are disclosed in U.S. Pat. No. 6,929,186 ("Orientation-indicating machine-readable coded data") filed by the applicant or assignee of the present invention and the contents of which is herein incorporated by reference.

2.6 Tag Map

Decoding a tag typically results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. The tag map class diagram is shown in FIG. 22, as part of the netpage printer class diagram.

A tag map reflects the scheme used to tile the surface region with tags, and this can vary according to surface type. When multiple tagged regions share the same tiling scheme and the same tag numbering scheme, they can also share the same tag map.

The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encode Cartesian (x-y) coordinates or polar coordinates, depending on the surface type on which it appears. The tag ID structure is dictated by and known to the tag map, and tag IDs associated with different tag maps may therefore have different structures.

With the tagging scheme described above, the tags usually function in cooperation with associated visual elements on the netpage. These function as user interactive elements in that a user can interact with the printed page using an appropriate sensing device in order for tag data to be read by the sensing device and for an appropriate response to be generated in the netpage system.

Additionally (or alternatively), decoding a tag may be used to provide orientation data indicative of the yaw of the pen relative to the surface. The orientation data may be determined using, for example, the orientation axis 16 described above (Section 2.3) or orientation data embedded in the tag data (Section 2.5).

3 Document and Page Descriptions

Figure 12:
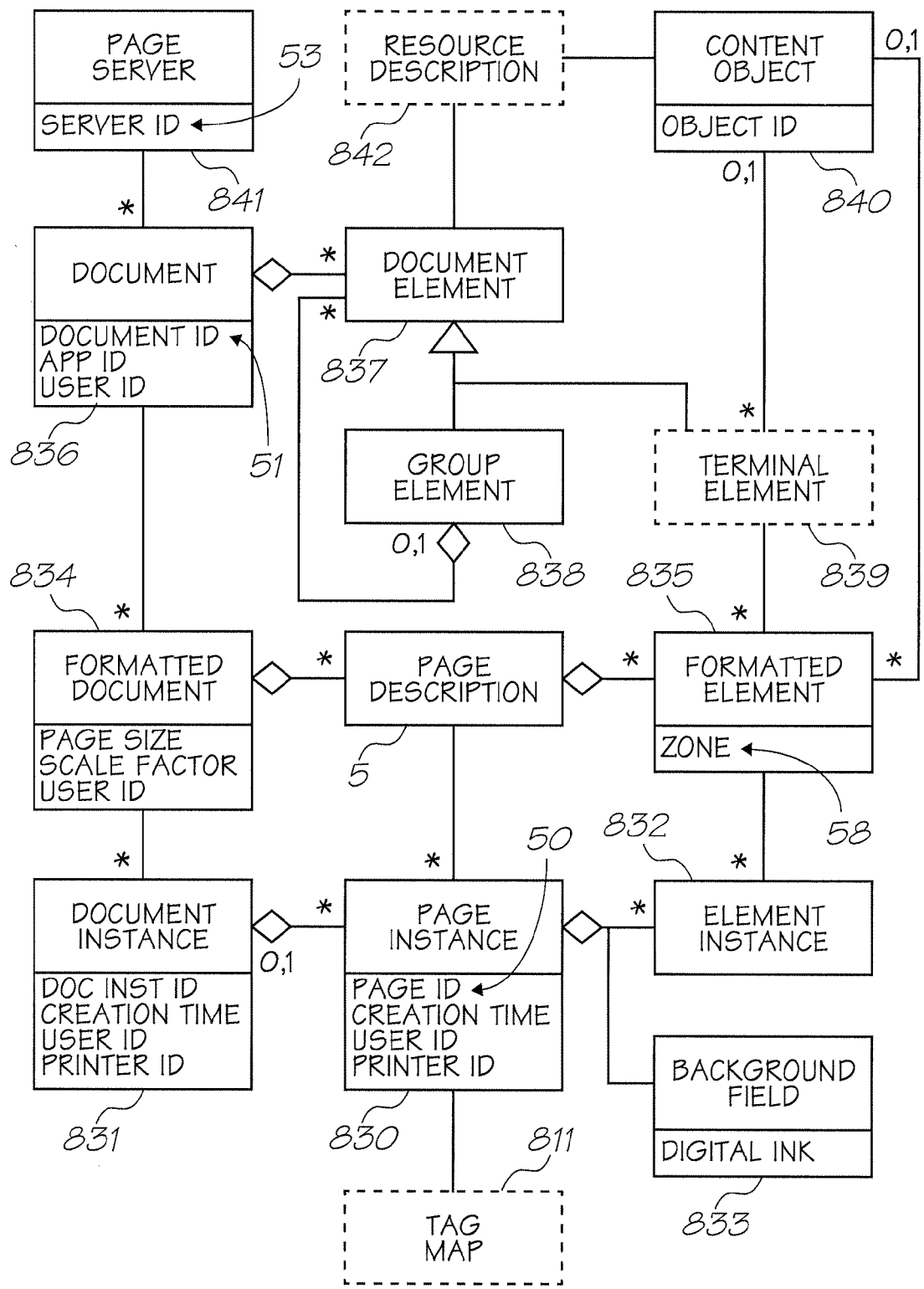
FIG. 12 is a schematic view of a document and page description class diagram.
Figure 13:
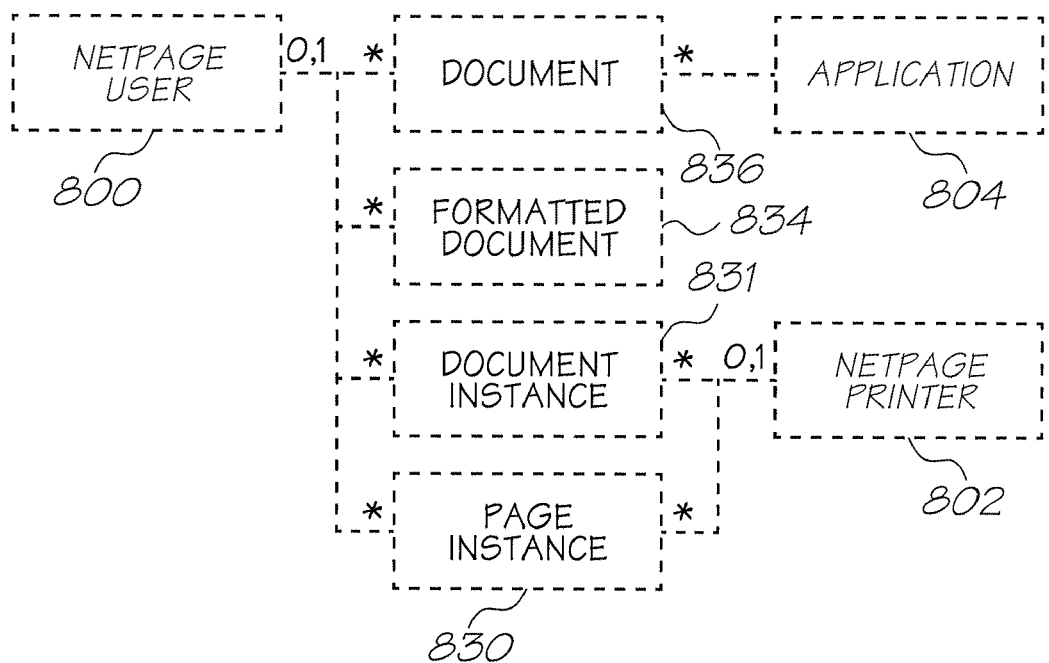
FIG. 13 is a schematic view of a document and page ownership class diagram.

A preferred embodiment of a document and page description class diagram is shown in FIGS. 12 and 13.

In the netpage system a document is described at three levels. At the most abstract level the document 836 has a hierarchical structure whose terminal elements 839 are associated with content objects 840 such as text objects, text style objects, image objects, etc. Once the document is printed on a printer with a particular page size, the document is paginated and otherwise formatted. Formatted terminal elements 835 will in some cases be associated with content objects which are different from those associated with their corresponding terminal elements, particularly where the content objects are style-related. Each printed instance of a document and page is also described separately, to allow input captured through a particular page instance 830 to be recorded separately from input captured through other instances of the same page description.

The presence of the most abstract document description on the page server allows a copy of a document to be printed without being forced to accept the source document's specific format. The user or a printing press may be requesting a copy for a printer with a different page size, for example. Conversely, the presence of the formatted document description on the page server allows the page server to efficiently interpret user actions on a particular printed page.

A formatted document 834 consists of a set of formatted page descriptions 5, each of which consists of a set of formatted terminal elements 835. Each formatted element has a spatial extent or zone 58 on the page. This defines the active area of input elements such as hyperlinks and input fields.

A document instance 831 corresponds to a formatted document 834. It consists of a set of page instances 830, each of which corresponds to a page description 5 of the formatted document. Each page instance 830 describes a single unique printed netpage 1, and records the page ID 50 of the netpage. A page instance is not part of a document instance if it represents a copy of a page requested in isolation.

A page instance consists of a set of terminal element instances 832. An element instance only exists if it records instance-specific information. Thus, a hyperlink instance exists for a hyperlink element because it records a transaction ID 55 which is specific to the page instance, and a field instance exists for a field element because it records input specific to the page instance. An element instance does not exist, however, for static elements such as textflows.

Figure 14:
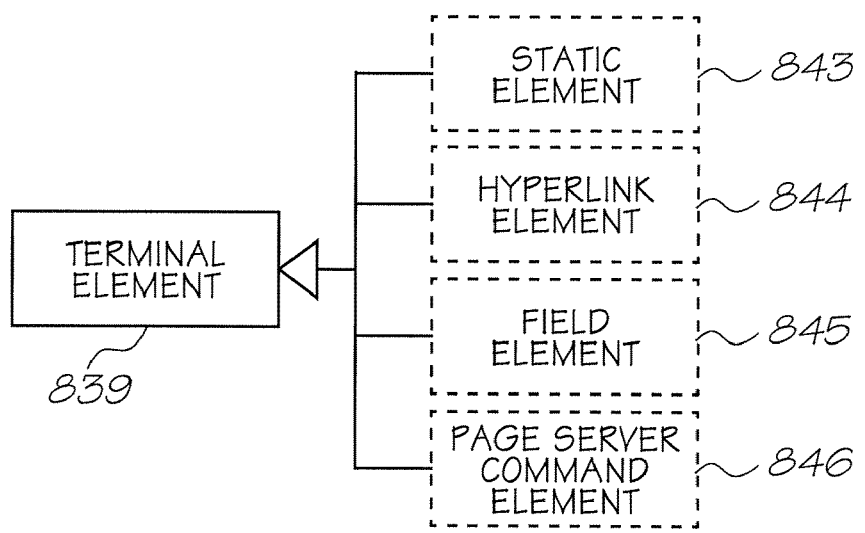
FIG. 14 is a schematic view of a terminal element specialization class diagram.

A terminal element 839 can be a visual element or an input element. A visual element can be a static element 843 or a dynamic element 846. An input element may be, for example, a hyperlink element 844 or a field element 845, as shown in FIG. 14. Other types of input element are of course possible, such a input elements, which select a particular mode of the pen 101.

A page instance has a background field 833 which is used to record any digital ink captured on the page which does not apply to a specific input element.

In the preferred form of the invention, a tag map 811 is associated with each page instance to allow tags on the page to be translated into locations on the page.

4 The Netpage Network

In one embodiment, a netpage network consists of a distributed set of netpage page servers 10, netpage registration servers 11, netpage ID servers 12, netpage application servers 13, and netpage relay devices 601 connected via a network 19 such as the Internet, as shown in FIG. 3.

The netpage registration server 11 is a server which records relationships between users, pens, printers and applications, and thereby authorizes various network activities. It authenticates users and acts as a signing proxy on behalf of authenticated users in application transactions. It also provides handwriting recognition services. As described above, a netpage page server 10 maintains persistent information about page descriptions and page instances. The netpage network includes any number of page servers, each handling a subset of page instances. Since a page server also maintains user input values for each page instance, clients such as netpage relays 601 send netpage input directly to the appropriate page server. The page server interprets any such input relative to the description of the corresponding page.

A netpage ID server 12 allocates document IDs 51 on demand, and provides load-balancing of page servers via its ID allocation scheme.

A netpage relay 601 uses the Internet Distributed Name System (DNS), or similar, to resolve a netpage page ID 50 into the network address of the netpage page server 10 handling the corresponding page instance.

A netpage application server 13 is a server which hosts interactive netpage applications.

Netpage servers can be hosted on a variety of network server platforms from manufacturers such as IBM, Hewlett-Packard, and Sun. Multiple netpage servers can run concurrently on a single host, and a single server can be distributed over a number of hosts. Some or all of the functionality provided by netpage servers, and in particular the functionality provided by the ID server and the page server, can also be provided directly in a netpage appliance such as a netpage printer, in a computer workstation, or on a local network.

5 The Netpage Pen

The active sensing device of the netpage system may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). A pen 101 is described herein, although it will be appreciated that clickers and pointers may have similar features. The pen 101 uses its embedded controller 134 to capture and decode netpage tags from a page via an image sensor. The image sensor is a solid-state device provided with an appropriate filter to permit sensing at only near-infrared wavelengths. As described in more detail below, the system is able to sense when the nib is in contact with the surface, and the pen is able to sense tags at a sufficient rate to capture human handwriting (i.e. at 200 dpi or greater and 100 Hz or faster). Information captured by the pen may be encrypted and wirelessly transmitted to the printer (or base station), the printer or base station interpreting the data with respect to the (known) page structure.

Figure 11:
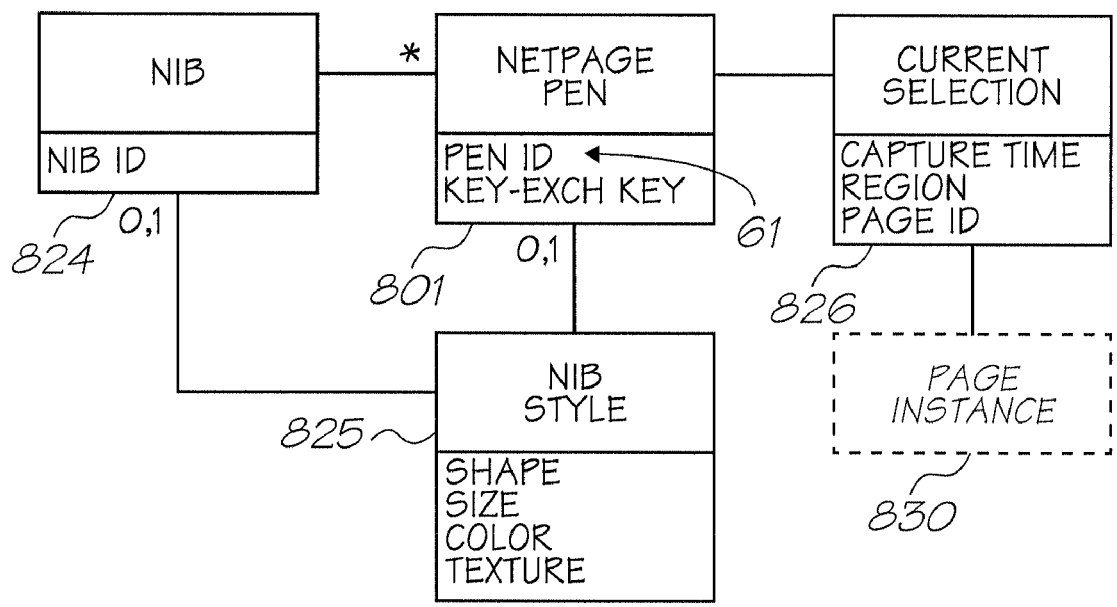
FIG. 11 is a schematic view of a pen class diagram.

The preferred embodiment of the netpage pen 101 operates both as a normal marking ink pen and as a non-marking stylus (i.e. as a pointer). The marking aspect, however, is not necessary for using the netpage system as a browsing system, such as when it is used as an Internet interface. Each netpage pen is registered with the netpage system and has a unique pen ID 61. FIG. 11 shows the netpage pen class diagram, reflecting pen-related information maintained by a registration server 11 on the netpage network.

When the nib is in contact with a netpage, the pen determines its position and orientation relative to the page. The nib is attached to a force sensor, and the force on the nib is interpreted relative to a threshold to indicate whether the pen is "up" or "down". This allows an interactive element on the page to be 'clicked' by pressing with the pen nib, in order to request, say, information from a network. Furthermore, the force may be captured as a continuous value to allow, say, the full dynamics of a signature to be verified.

The pen determines the position and orientation of its nib on the netpage by imaging, in the infrared spectrum, an area 193 of the page in the vicinity of the nib. It decodes the nearest tag and computes the position of the nib relative to the tag from the observed perspective distortion on the imaged tag and the known geometry of the pen optics. Although the position resolution of the tag may be low, because the tag density on the page is inversely proportional to the tag size, the adjusted position resolution is quite high, exceeding the minimum resolution required for accurate handwriting recognition.

Pen actions relative to a netpage are captured as a series of strokes. A stroke consists of a sequence of time-stamped pen positions on the page, initiated by a pen-down event and completed by the subsequent pen-up event. A stroke is also tagged with the page ID 50 of the netpage whenever the page ID changes, which, under normal circumstances, is at the commencement of the stroke.

Each netpage pen has a current selection 826 associated with it, allowing the user to perform copy and paste operations etc. The selection is timestamped to allow the system to discard it after a defined time period. The current selection describes a region of a page instance. It consists of the most recent digital ink stroke captured through the pen relative to the background area of the page. It is interpreted in an application-specific manner once it is submitted to an application via a selection hyperlink activation.

Each pen has a current nib 824. This is the nib last notified by the pen to the system. In the case of the default netpage pen described above, either the marking black ink nib or the non-marking stylus nib is current. Each pen also has a current nib style 825. This is the nib style last associated with the pen by an application, e.g. in response to the user selecting a color from a palette. The default nib style is the nib style associated with the current nib. Strokes captured through a pen are tagged with the current nib style. When the strokes are subsequently reproduced, they are reproduced in the nib style with which they are tagged.

The pen 101 may have one or more buttons 209. As described in U.S. application Ser. No. 11/672,950 filed on Feb. 8, 2007 (the contents of which is herein incorporated by reference), the button(s) may be used to determine a mode or behavior of the pen, which, in turn, determines how a stroke or, more generally, interaction data is interpreted by the page server 10.

Whenever the pen is within range of a relay device 601 with which it can communicate, the pen slowly flashes its "online" LED. When the pen fails to decode a stroke relative to the page, it momentarily activates its "error" LED. When the pen succeeds in decoding a stroke relative to the page, it momentarily activates its "ok" LED.

A sequence of captured strokes is referred to as digital ink. Digital ink forms the basis for the digital exchange of drawings and handwriting, for online recognition of handwriting, and for online verification of signatures.

The pen is typically wireless and transmits digital ink to the relay device 601 via a short-range radio link. The transmitted digital ink is encrypted for privacy and security and packetized for efficient transmission, but is always flushed on a pen-up event to ensure timely handling in the printer.

When the pen is out-of-range of a relay device 601 it buffers digital ink in internal memory, which has a capacity of over ten minutes of continuous handwriting. When the pen is once again within range of a relay device, it transfers any buffered digital ink.

A pen can be registered with any number of relay devices, but because all state data resides in netpages both on paper and on the network, it is largely immaterial which relay device a pen is communicating with at any particular time.

One embodiment of the pen is described in greater detail in Section 7 below, with reference to FIGS. 8 to 10.

6 Netpage Interaction

The netpage relay device 601 receives data relating to a stroke from the pen 101 when the pen is used to interact with a netpage 1. The coded data 3 of the tags 4 is read by the pen when it is used to execute a movement, such as a stroke. The data allows the identity of the particular page to be determined and an indication of the positioning of the pen relative to the page to be obtained. Interaction data, typically comprising the page ID 50 and at least one position of the pen, is transmitted to the relay device 601, where it resolves, via the DNS, the page ID 50 of the stroke into the network address of the netpage page server 10 which maintains the corresponding page instance 830. It then transmits the stroke to the page server. If the page was recently identified in an earlier stroke, then the relay device may already have the address of the relevant page server in its cache. Each netpage consists of a compact page layout maintained persistently by a netpage page server (see below). The page layout refers to objects such as images, fonts and pieces of text, typically stored elsewhere on the netpage network.

When the page server receives the stroke from the pen, it retrieves the page description to which the stroke applies, and determines which element of the page description the stroke intersects. It is then able to interpret the stroke in the context of the type of the relevant element.

A "click" is a stroke where the distance and time between the pen down position and the subsequent pen up position are both less than some small maximum. An object which is activated by a click typically requires a click to be activated, and accordingly, a longer stroke is ignored. The failure of a pen action, such as a "sloppy" click, to register may be indicated by the lack of response from the pen's "ok" LED.

Hyperlinks and form fields are two kinds of input elements, which may be contained in a netpage page description. Input through a form field can also trigger the activation of an associated hyperlink. These types of input elements are described in further detail in the above-identified patents and patent applications, the contents of which are herein incorporated by cross-reference.

7 Detailed Netpage Pen Description 7.1 Pen Mechanics

Figure 8:
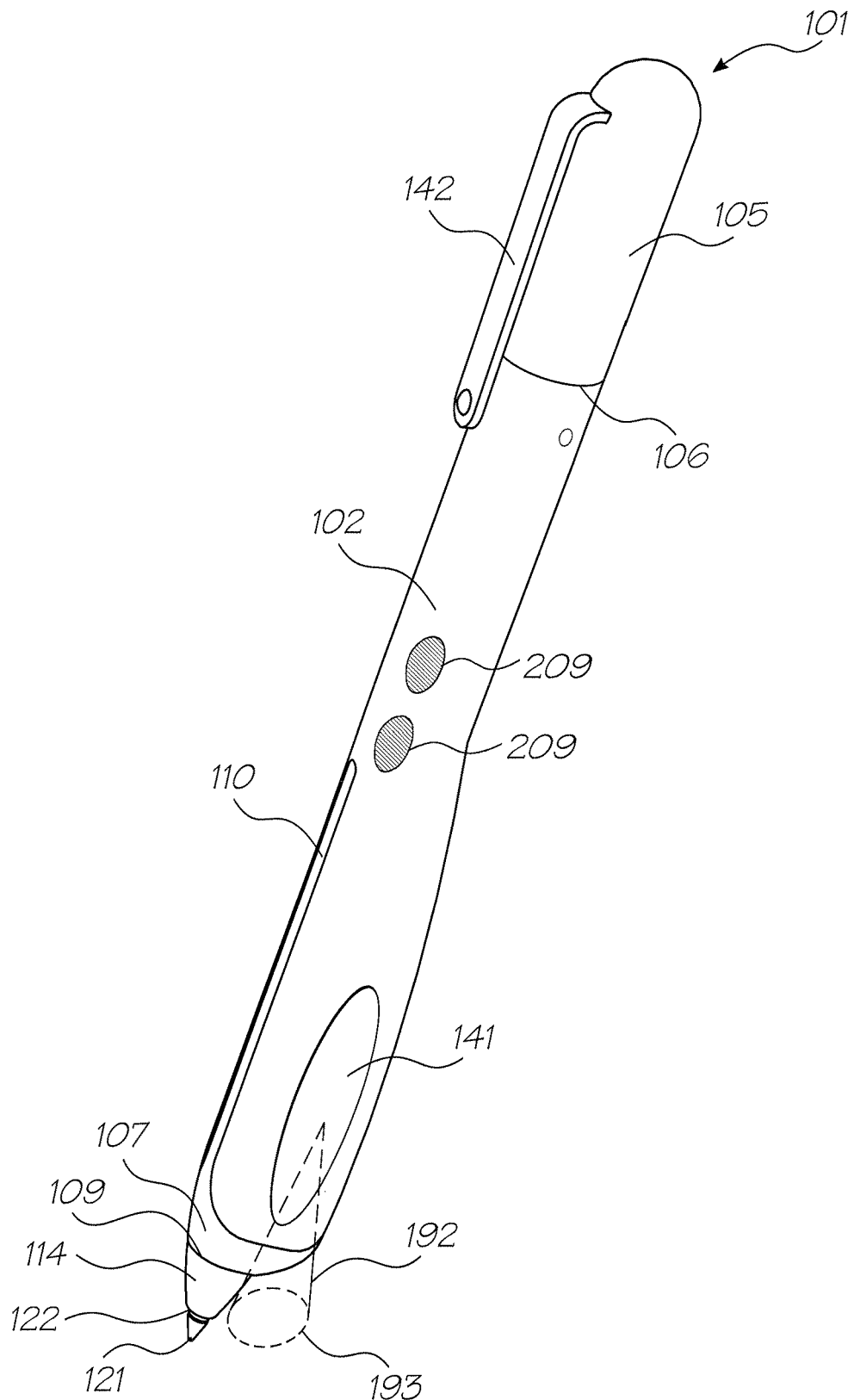
FIG. 8 is a perspective view of a netpage pen and its associated tag-sensing field-of-view cone.
Figure 9:
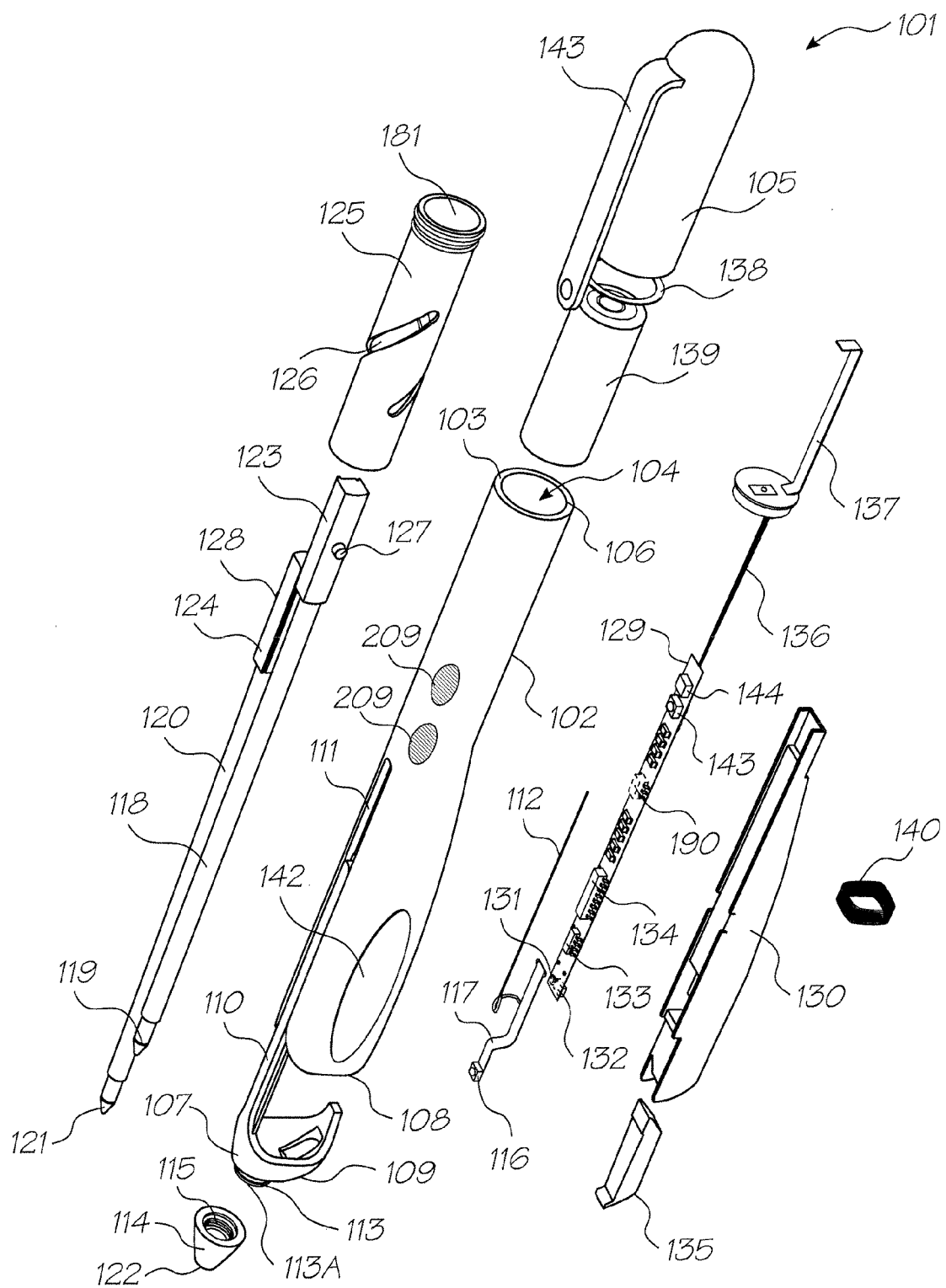
FIG. 9 is a perspective exploded view of the netpage pen shown in FIG. 8.
Figure 10:
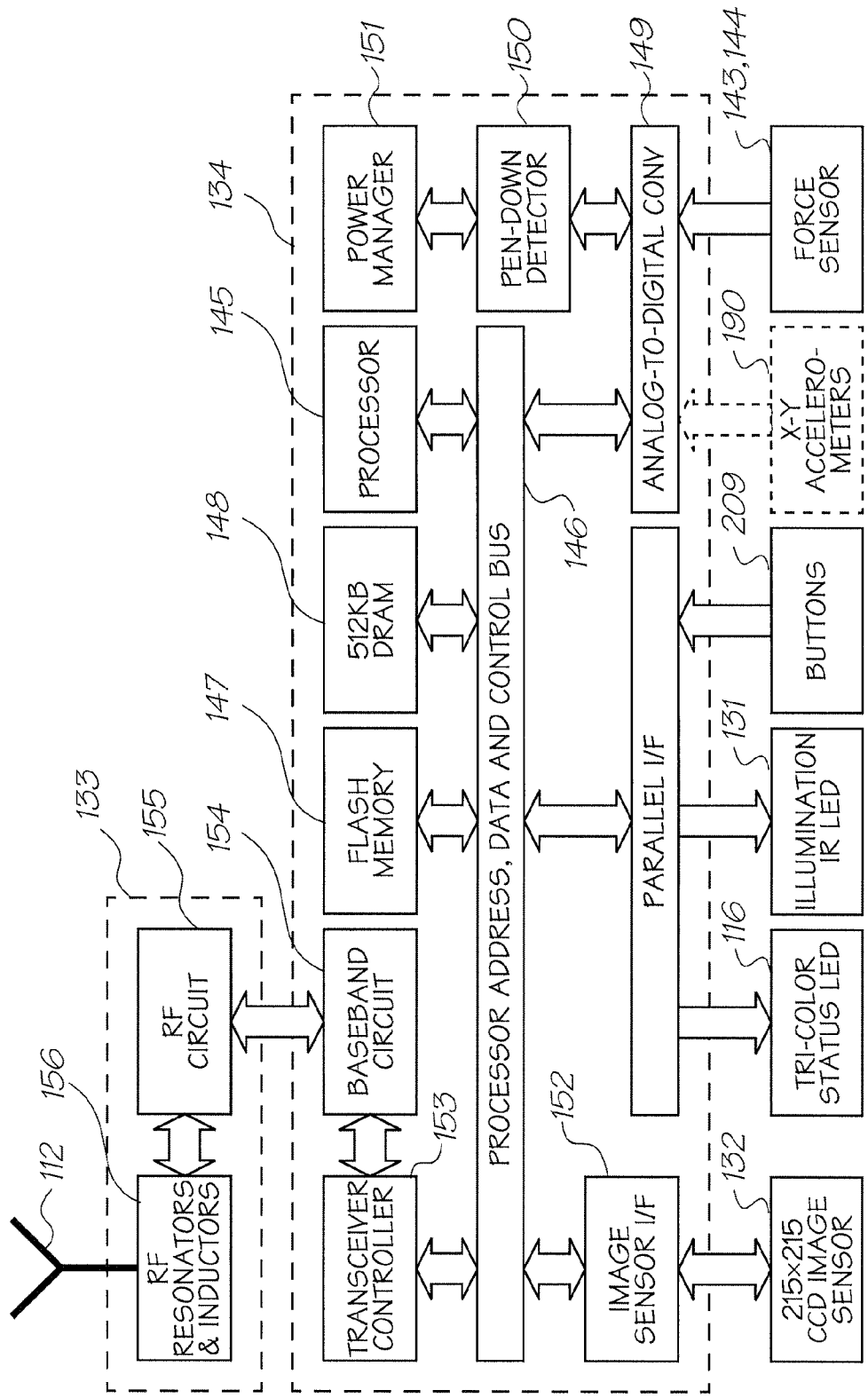
FIG. 10 is a schematic block diagram of a pen controller for the netpage pen shown in FIGS. 8 and 9.

Referring to FIGS. 8 and 9, the pen, generally designated by reference numeral 101, includes a housing 102 in the form of a plastics moulding having walls 103 defining an interior space 104 for mounting the pen components. Mode selector buttons 209 are provided on the housing 102. The pen top 105 is in operation rotatably mounted at one end 106 of the housing 102. A semi-transparent cover 107 is secured to the opposite end 108 of the housing 102. The cover 107 is also of moulded plastics, and is formed from semi-transparent material in order to enable the user to view the status of the LED mounted within the housing 102. The cover 107 includes a main part 109 which substantially surrounds the end 108 of the housing 102 and a projecting portion 110 which projects back from the main part 109 and fits within a corresponding slot 111 formed in the walls 103 of the housing 102. A radio antenna 112 is mounted behind the projecting portion 110, within the housing 102. Screw threads 113 surrounding an aperture 113A on the cover 107 are arranged to receive a metal end piece 114, including corresponding screw threads 115. The metal end piece 114 is removable to enable ink cartridge replacement.

Also mounted within the cover 107 is a tri-color status LED 116 on a flex PCB 117. The antenna 112 is also mounted on the flex PCB 117. The status LED 116 is mounted at the top of the pen 101 for good all-around visibility.

The pen can operate both as a normal marking ink pen and as a non-marking stylus. An ink pen cartridge 118 with nib 119 and a stylus 120 with stylus nib 121 are mounted side by side within the housing 102. Either the ink cartridge nib 119 or the stylus nib 121 can be brought forward through open end 122 of the metal end piece 114, by rotation of the pen top 105. Respective slider blocks 123 and 124 are mounted to the ink cartridge 118 and stylus 120, respectively. A rotatable cam barrel 125 is secured to the pen top 105 in operation and arranged to rotate therewith. The cam barrel 125 includes a cam 126 in the form of a slot within the walls 181 of the cam barrel. Cam followers 127 and 128 projecting from slider blocks 123 and 124 fit within the cam slot 126. On rotation of the cam barrel 125, the slider blocks 123 or 124 move relative to each other to project either the pen nib 119 or stylus nib 121 out through the hole 122 in the metal end piece 114. The pen 101 has three states of operation. By turning the top 105 through 90° steps, the three states are:

Stylus 120 nib 121 out;

Ink cartridge 118 nib 119 out; and

Neither ink cartridge 118 nib 119 out nor stylus 120 nib 121 out.

A second flex PCB 129, is mounted on an electronics chassis 130 which sits within the housing 102. The second flex PCB 129 mounts an infrared LED 131 for providing infrared radiation for projection onto the surface. An image sensor 132 is provided mounted on the second flex PCB 129 for receiving reflected radiation from the surface. The second flex PCB 129 also mounts a radio frequency chip 133, which includes an RF transmitter and RF receiver, and a controller chip 134 for controlling operation of the pen 101. An optics block 135 (formed from moulded clear plastics) sits within the cover 107 and projects an infrared beam onto the surface and receives images onto the image sensor 132. Power supply wires 136 connect the components on the second flex PCB 129 to battery contacts 137 which are mounted within the cam barrel 125. A terminal 138 connects to the battery contacts 137 and the cam barrel 125. A three volt rechargeable battery 139 sits within the cam barrel 125 in contact with the battery contacts. An induction charging coil 140 is mounted about the second flex PCB 129 to enable recharging of the battery 139 via induction. The second flex PCB 129 also mounts an infrared LED 143 and infrared photodiode 144 for detecting displacement in the cam barrel 125 when either the stylus 120 or the ink cartridge 118 is used for writing, in order to enable a determination of the force being applied to the surface by the pen nib 119 or stylus nib 121. The IR photodiode 144 detects light from the IR LED 143 via reflectors (not shown) mounted on the slider blocks 123 and 124.

Rubber grip pads 141 and 142 are provided towards the end 108 of the housing 102 to assist gripping the pen 101, and top 105 also includes a clip 142 for clipping the pen 101 to a pocket.

7.2 Pen Controller

The pen 101 is arranged to determine the position of its nib (stylus nib 121 or ink cartridge nib 119) by imaging, in the infrared spectrum, an area of the surface in the vicinity of the nib. It records the location data from the nearest location tag, and is arranged to calculate the distance of the nib 121 or 119 from the location tab utilising optics 135 and controller chip 134. The controller chip 134 calculates the orientation (yaw) of the pen using an orientation indicator in the imaged tag, and the nib-to-tag distance from the perspective distortion observed on the imaged tag.

Utilising the RF chip 133 and antenna 112 the pen 101 can transmit the digital ink data (which is encrypted for security and packaged for efficient transmission) to the computing system.

When the pen is in range of a relay device 601, the digital ink data is transmitted as it is formed. When the pen 101 moves out of range, digital ink data is buffered within the pen 101 (the pen 101 circuitry includes a buffer arranged to store digital ink data for approximately 12 minutes of the pen motion on the surface) and can be transmitted later.

In Applicant's U.S. Pat. No. 6,870,966, the contents of which is incorporated herein by reference, a pen 101 having an interchangeable ink cartridge nib and stylus nib was described. Accordingly, and referring to FIG. 27, when the pen 101 connects to the computing system, the controller 134 notifies the system of the pen ID, nib ID 175, current absolute time 176, and the last absolute time it obtained from the system prior to going offline. The pen ID allows the computing system to identify the pen when there is more than one pen being operated with the computing system.

The nib ID allows the computing system to identify which nib (stylus nib 121 or ink cartridge nib 119) is presently being used. The computing system can vary its operation depending upon which nib is being used. For example, if the ink cartridge nib 119 is being used the computing system may defer producing feedback output because immediate feedback is provided by the ink markings made on the surface. Where the stylus nib 121 is being used, the computing system may produce immediate feedback output.

Since a user may change the nib 119, 121 between one stroke and the next, the pen 101 optionally records a nib ID for a stroke 175. This becomes the nib ID implicitly associated with later strokes.

Cartridges having particular nib characteristics may be interchangeable in the pen. The pen controller 134 may interrogate a cartridge to obtain the nib ID 175 of the cartridge. The nib ID 175 may be stored in a ROM or a barcode on the cartridge. The controller 134 notifies the system of the nib ID whenever it changes. The system is thereby able to determine the characteristics of the nib used to produce a stroke 175, and is thereby subsequently able to reproduce the characteristics of the stroke itself.

The controller chip 134 is mounted on the second flex PCB 129 in the pen 101. FIG. 10 is a block diagram illustrating in more detail the architecture of the controller chip 134. FIG. 10 also shows representations of the RF chip 133, the image sensor 132, the tri-color status LED 116, the IR illumination LED 131, the IR force sensor LED 143, and the force sensor photodiode 144.

The pen controller chip 134 includes a controlling processor 145. Bus 146 enables the exchange of data between components of the controller chip 134. Flash memory 147 and a 512 KB DRAM 148 are also included. An analog-to-digital converter 149 is arranged to convert the analog signal from the force sensor photodiode 144 to a digital signal.

An image sensor interface 152 interfaces with the image sensor 132. A transceiver controller 153 and base band circuit 154 are also included to interface with the RF chip 133 which includes an RF circuit 155 and RF resonators and inductors 156 connected to the antenna 112.

The controlling processor 145 captures and decodes location data from tags from the surface via the image sensor 132, monitors the force sensor photodiode 144, controls the LEDs 116, 131 and 143, and handles short-range radio communication via the radio transceiver 153. It is a medium-performance (~40 MHz) general-purpose RISC processor.

The processor 145, digital transceiver components (transceiver controller 153 and baseband circuit 154), image sensor interface 152, flash memory 147 and 512 KB DRAM 148 are integrated in a single controller ASIC. Analog RF components (RF circuit 155 and RF resonators and inductors 156) are provided in the separate RF chip.

The image sensor is a 215×215 pixel CCD (such a sensor is produced by Matsushita Electronic Corporation, and is described in a paper by Itakura, K T Nobusada, N Okusenya, R Nagayoshi, and M Ozaki, "A 1 mm 50 k-Pixel IT CCD Image Sensor for Miniature Camera System", IEEE Transactions on Electronic Devices, Volt 47, number 1, January 2000, which is incorporated herein by reference) with an IR filter.

The controller ASIC 134 enters a quiescent state after a period of inactivity when the pen 101 is not in contact with a surface. It incorporates a dedicated circuit 150 which monitors the force sensor photodiode 144 and wakes up the controller 134 via the power manager 151 on a pen-down event.

The radio transceiver communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

In an alternative embodiment, the pen incorporates an Infrared Data Association (IrDA) interface for short-range communication with a base station or netpage printer.

7.3 Alternative Motion Sensor

In a further embodiment, the pen 101 includes a pair of orthogonal accelerometers mounted in the normal plane of the pen 101 axis. The accelerometers 190 are shown in FIGS. 9 and 10 in ghost outline, although it will be appreciated that other alternative motion sensors may be used instead of the accelerometers 190.

The provision of the accelerometers enables this embodiment of the pen 101 to sense motion without reference to surface location tags. Each location tag ID can then identify an object of interest rather than a position on the surface. For example, if the object is a user interface input element (e.g. a command button), then the tag ID of each location tag within the area of the input element can directly identify the input element.

The acceleration measured by the accelerometers in each of the x and y directions is integrated with respect to time to produce an instantaneous velocity and position.

Since the starting position of the stroke may not be known, only relative positions within a stroke are calculated. Although position integration accumulates errors in the sensed acceleration, accelerometers typically have high resolution, and the time duration of a stroke, over which errors accumulate, is short.

It will be appreciated that a number of alternative (or additional) motion sensors may be employed in a Netpage pen 101. These typically either measure absolute displacement or relative displacement. For example, an optical mouse that measures displacement relative to an external grid (see U.S. Pat. No. 4,390,873 and U.S. Pat. No. 4,521,772) measures absolute displacement, whereas a mechanical mouse that measures displacement via the movement of a wheel or ball in contact with the surface (see U.S. Pat. No. 3,541,541 and U.S. Pat. No. 4,464,652) measures relative displacement because measurement errors accumulate. An optical mouse that measures displacement relative to surface texture (see U.S. Pat. No. 6,631,218, U.S. Pat. No. 6,281,882, U.S. Pat. No. 6,297,513 and U.S. Pat. No. 4,794,384), measures relative displacement for the same reason. Motion sensors based on point interferometry (see U.S. Pat. No. 6,246,482) or acceleration (see U.S. Pat. No. 4,787,051) also measure relative displacement. The contents of all US patents identified in the preceding paragraph relating to motion sensors are herein incorporated by reference.

7.4 Barcode Reading Pen

It would be desirable for the Netpage pen 101 to be capable of reading bar codes, including linear bar codes and 2D bar codes, as well as Netpage tags 4. The most obvious such function is the ability to read the UPC/EAN bar codes that appear on consumer packaged goods. The utility of a barcode reading pen is discussed in our earlier U.S. patent application Ser. No. 10/815,647 filed on Apr. 2, 2004, the contents of which is incorporated herein by reference. It would be particularly desirable for the pen to capable of reading both Netpage tags 4 and barcodes without any significant design modifications or a requirement to be placed in a special barcode-reading mode.

7.4.1 Barcode Reading Requirements

Figure 15:
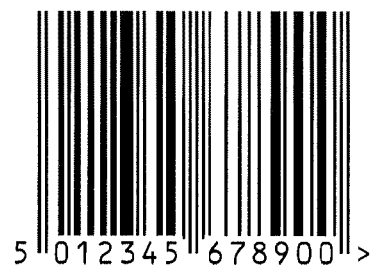
FIG. 15 shows a typical EAN-13 bar code symbol.

To support the reading of bar coded trade items worldwide, the pen 101 must support the following symbologies: EAN-13, UPC-A, EAN-8 and UPC-E. FIG. 15 shows a sample EAN-13 bar code symbol.

Each bar code symbol in the EAN/UPC family (with the exception of the simplified UPC-E) consists of the following components:

a left quiet zone
a left normal guard bar pattern
a fixed number of left half symbol characters
a centre guard bar pattern
a fixed number of right half symbol characters
a right normal guard bar pattern
a right quiet zone Each symbol character encodes a digit between 0 and 9, and consists of two bars and two spaces, each between one and four modules wide, for a fixed total of seven modules per character. Symbol characters are self-checking.

The nominal width of a module is 0.33 mm. It can be printed with an actual width ranging from 75% to 200% of the nominal width, i.e. from 0.25 mm to 0.66 mm, but must have a consistent width within a single symbol instance.

An EAN-13 bar code symbol directly encodes 12 characters, i.e. six per half. It encodes a thirteenth character in the parities of its six left-half characters. A UPC-A symbol encodes 12 characters. An EAN-8 symbol encodes 8 characters. A UPC-E symbol encodes 6 characters, without a centre guard bar pattern and with a special right guard bar pattern.

The nominal width of an EAN-13 and UPC-A bar code is 109 modules (including the left and right quiet zones), or about 36 mm. It may be printed with an actual width ranging from 27 mm to 72 mm.

EAN/UPC bar codes are designed to be imaged under narrowband 670 nm illumination, with spaces being generally reflective (light) and bars being generally non-reflective (dark). Since most bar codes are traditionally printed using a broadband-absorptive black ink on a broadband reflective white substrate, other illumination wavelengths, such as wavelengths in the near infrared, allow most bar codes to be acquired. A Netpage pen 101, which images under near-infrared 810 nm illumination, has a native ability to image most bar codes. However, since some bar codes are printed using near-infrared-transparent black, green and blue inks, near-infrared imaging may not be fully adequate in all circumstances, and 670 nm imaging is therefore important. Accordingly, the Netpage pen 101 may be supplemented with an additional light source, if required.

7.4.2 Traditional Barcode Reading Strategies

One strategy for acquiring a linear bar code is to capture a single image of the entire bar code. This technique is used in the majority of linear bar code readers, and is also used by existing hybrid linear/2D barcode readers. However, as discussed above, each Netpage tag 4 typically has a maximum dimension of about 4 mm and the Netpage pen 101 is designed primarily for capturing images of Netpage tags. Accordingly, the image sensor 132 does not have a sufficiently large field of view to acquire an entire bar code from a single image, since the field of view is only about 6 mm when in contact with a surface. This strategy is therefore unsatisfactory, because it would require significant design modifications of the pen 101 by incorporation of a separate barcode-reading sensor having a larger field of view. This would inevitably increase the size and adversely affect ergonomics of the pen.

Another strategy for acquiring a linear bar code is to capture a dense series of point samples of the bar code as the reader is swiped across the bar code. Typically, a light source from the tip of a barcode reading pen focuses a dot of light onto the bar code. The pen is swiped across the bar code in a steady even motion and a waveform of the barcode in constructed by a photodiode measuring the intensity of light reflected back from the bar code. The dot of light should be equal to or slightly smaller than the narrowest bar width. If the dot is wider than the width of the narrowest bar or space, then the dot will overlap two or more bars at a time so that clear transitions between bars and spaces cannot be distinguished. If the dot is too small, then any spots or voids in the bars can be misinterpreted as light areas also making a bar code unreadable. Typically, the dot of light for reading standard bar codes has a diameter of 0.33 mm or less. Since the light source of the Netpage pen 101 illuminates a relatively large area (about 6 mm in diameter) to read Netpage tags 4, then point sampling is an unsatisfactory means for acquiring a linear bar code. It would require incorporation of a separate barcode-reading system in the Netpage pen 101. Moreover, point sampling is a generally unreliable means for acquiring linear bar codes, because it requires a steady swiping motion of constant velocity.

7.4.3 Frame-Based Barcode Scanning

An alternative strategy for acquiring a linear bar code is to capture a series of overlapping partial 2D images of the bar code by swiping a Netpage pen 101 across a surface.

To allow the reader to adopt this alternative strategy it must be able to guarantee sufficient overlap between successive images to allow it to unambiguously align them. The faster the reader is swiped across the surface, the higher its temporal sampling rate must be to ensure sufficient overlap. The larger the scale of the bar code, the larger the overlap needs to be, and so the higher the reader's temporal sampling rate must be to ensure sufficient overlap.

Although linear bar code acquisition and processing is normally done in one dimension, the use of a two-dimensional image sensor 132 allows the vertical dimension of the bar code to be used as a source of redundancy.

7.4.4 Reconstruction of a Barcode Waveform

7.4.4.1 Overview

Frame-based barcode scanning can be used to decode barcodes using a 2D image sensor where the barcode is larger than the field of view of the imaging system. To do this, multiple images of the barcode are generated by scanning the image sensor across the barcode and capturing images at a constant rate. These regularly-sampled images are used to generate a set of one-dimensional (1D) frames (or waveform fragments) that represent the sequence of bars visible in the image. The frames (waveform fragments) are then aligned to generate a waveform that represents the entire barcode which is then used to decode the barcode. Obviously, the entire barcode must be scanned for decoding to be successful.

Unlike barcode processing methods that sample a single point during scanning, frame-based scanning is not sensitive to local variations in scan velocity. The method even allows the scan movement to stop and reverse during scanning (although processing is simplified if this is not allowed as in the method discussed below). The method is also more robust than the single point sampling technique, since imaging a large region of the barcode allows noise and distortion to be attenuated using filtering.

The alignment of the 1D frames requires a minimum overlap between successive frames, which imposes a maximum scan velocity constraint:

maximum scan velocity=(1−minimum overlap)×sampling rate×field of view

As an example, if the minimum overlap required is 40%, the sampling rate is 100 Hz, and the field of view is 6 mm, then:

maximum scan velocity=(1−0.4)×100×6=360 mm/sec

If the maximum scan velocity is exceeded during a scan, the barcode will typically fail to decode. Obviously, the maximum scan velocity can be increased by increasing the sampling rate, increasing field of view, or decreasing the required minimum overlap between frames (although this may lead to errors in frame alignment and waveform reconstruction).

7.4.4.2 Processing

The following steps are performed during frame-based barcode scanning:

Image Equalization

Image equalization is performed to increase the signal-to-noise ratio (SNR) of the captured images of the barcode. The equalization filter is a band-pass filter that combines a low-pass characteristic for noise suppression (essentially a matched filter) and a high-pass component to attenuate the distortion caused by optical effects and non-uniform illumination.

Orientation Estimation

The orientation of the barcode within an image must be estimated, since the imaging system may be arbitrarily oriented with respect to the barcode when an image is captured. To reduce the amount of processing required for orientation estimation, the process uses a decimated version of the equalized image.

To estimate the orientation, the image is first filtered using an edge-enhancement filter (e.g. Laplacian) to emphasise the edges between adjacent bars. The edge-enhanced image is then processed using a Hough transform, which is used to identify the orientation of the edges in the image. To do this, the Hough transform output is first rectified (i.e. each bin is replaced with the absolute value of that bin) to ensure that both positive and negative extrema values generated by the edges during edge enhancement contribute to the maxima calculation. A profile of the transform space along the axis representing the quantized angle is then projected. This profile is smoothed, and the barcode orientation is estimated by finding the bin containing the maximum value.

Note that the estimated orientation of the barcode is in the range 0° to (180−quantization)° since the barcode is bilaterally symmetric through its centre axis. This means that it is possible for the orientation to "reverse direction" during successive frames. For example, the orientation may jump from 2° to 178°, a change in direction of 176°, instead of the more likely 4° change in direction to −2° (or 358°). Thus, the orientation is constrained to change by less the 90° between successive frames by adding or subtracting increments of 180°.

Frame Extraction

The barcode orientation is used to generate a 1D frame from the full-resolution equalized image. To do this, a strip of the image oriented in the direction of the barcode is extracted, with the profile of this strip used as the 1D frame. Since the strip is arbitrarily orientated within the image, sub-pixel interpolation (e.g. bi-linear interpolation) must be used to extract the pixel values.

The length of the strip is typically the size of the effective field of view within the image, and the width determines the level of smoothing applied to the profile. If the strip is too narrow, the profile will not be sufficiently smoothed, whilst if the strip is too wide, the barcode edges may be blurred due to noise and quantization error in the orientation estimation.

Frame Filtering

Extracted frames must be normalized to ensure accurate frame alignment. To do this, the signal is smoothed to reduce noise, and any illumination variation is removed. The signal is then normalized to a fixed range, with a zero mean to ensure the energy in successive frames is approximately equal.

Frame Alignment

To generate the full waveform representation of the scanned barcode, the individual frames must be aligned. If the maximum scan velocity has not been exceeded, the signal in each frame will overlap that of the proceeding frame by at least the minimum overlap. Thus, two frames can be aligned by finding the sections of the frames that are similar.

The standard method of measuring the similarity of two sequences is cross-correlation. To find the optimal alignment between the two frames (i.e. the offset between the two frames caused by the movement of the image sensor over the barcode), a number of normalized cross-correlations are performed between the two frames, with the frames successively offset in the range 0 to (1−minimum overlap)*frame size samples. The offset that produces the maximum cross-correlation is selected as the optimal alignment.

Figure 16:
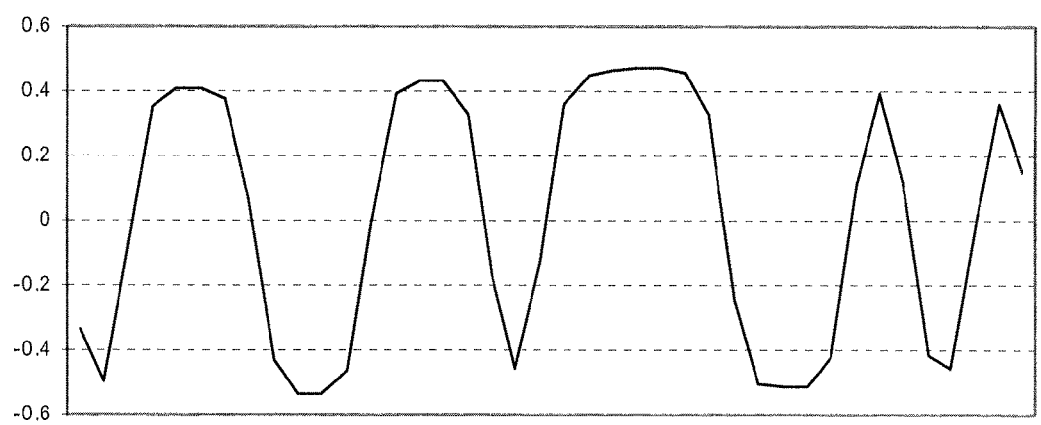
FIG. 16 shows two successive frames from a bar code scan.
Figure 16:
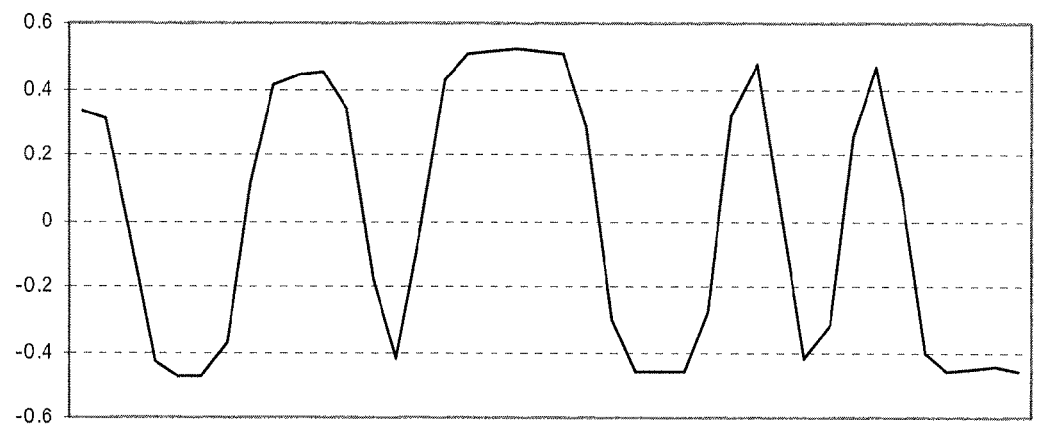
Figure 17:
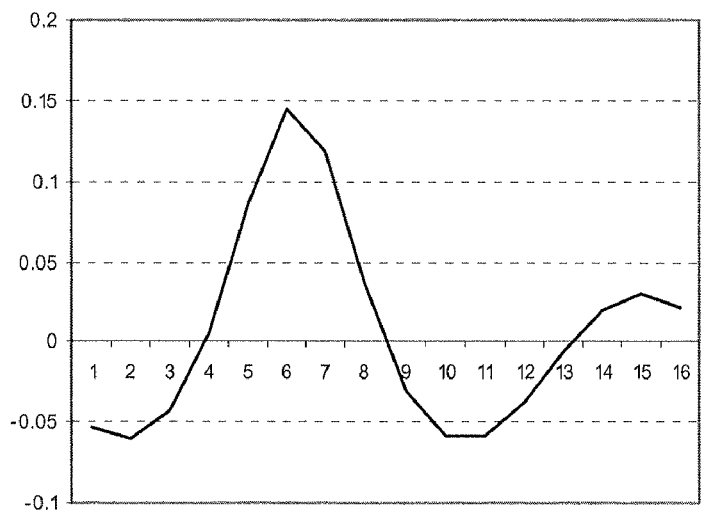
FIG. 17 shows the cross-correlation between the two frames shown in FIG. 16.
Figure 18:
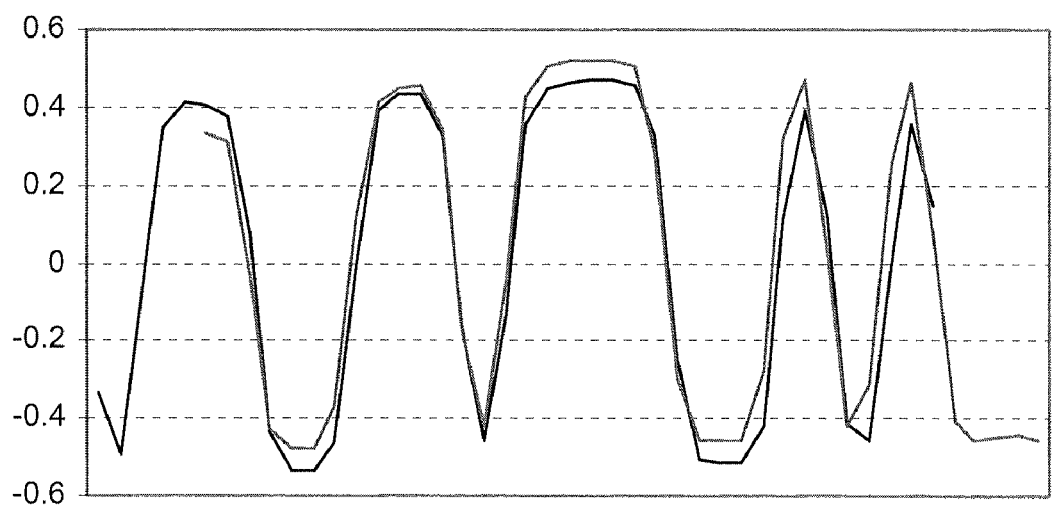
FIG. 18 shows the optimal alignment of the two frames shown in FIG. 16.

As an example, the two shown in FIG. 16 show two successive frames from a barcode scan. FIG. 17 shows the cross-correlation between the two frames shown in FIG. 16. Finally, the graph shown in FIG. 18 shows the optimal alignment of the two frames based on the maximum value of the cross-correlations.

Note the offset is dependent on the scan speed, with a slow scan generating small offsets, and a fast scan generating large offsets. In some cases, the cross-correlations between the frames can generate multiple maxima, each of which represents a possible frame alignment. By assuming the scanning speed does not change significantly between successive frames, linear prediction using previous (and possibly subsequent) frame offsets can be used to estimate the most likely offset within a frame, allowing the ambiguity of multiple cross-correlation maxima to be resolved.

Waveform Reconstruction

Once the optimal alignment of the frames has been found, the waveform must be reconstructed by piecing the individual frames together into a single, continuous signal. A simple way to do this is to append each frame to the waveform, skipping the region that overlaps with the previous frame. However, this approach is not optimal and often produces discontinuities in the waveform at frame boundaries.

An alternative approach is to use the average value of all the sample values in all frames that overlap a sample position within the waveform. Thus, the samples in each frame are simply added to the waveform using the appropriate alignment, and a count of the number of frame samples that contributed to each waveform sample is used to calculate the average sample value once all the frames have been added.

This process can be further improved by observing that the quality of the frame data is better near the centre of the frame, due to the effects of illumination and optical distortion in the captured images. Thus, the simple average can be replaced with a weighted average that emphasizes the samples near the centre of each frame (e.g. a Gaussian window).

A final improvement is to align each frame with the partially reconstructed waveform (i.e. constructed using all the frames up to the current frame) rather than with the previous frame. This reduces the degradation caused by noisy frames and limits the cumulative effect of alignment error caused by quantization and noise.

Once the waveform corresponding to the linear bar code has been reconstructed, the bar code can be decoded in the usual way, e.g. to yield a product code The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A method of recovering a waveform representing a linear bar code, the method including the steps of:
    moving a sensing device relative to the barcode, said sensing device having a two-dimensional image sensor;
    capturing, using the image sensor, a plurality of two-dimensional partial images of said bar code during said movement;
    determining, from at least one of the images, a direction substantially perpendicular to the bars of the bar code using a Hough transform for identifying an orientation of edges in the at least one image;
    determining, substantially along the direction, a waveform fragment corresponding to each captured image;
    determining an alignment between each pair of successive waveform fragments; and
    recovering, from the aligned waveform fragments, the waveform.

2. The method of claim 1, wherein a field of view of the image sensor is smaller than the length of the bar code.

3. The method of claim 1, wherein each partial two-dimensional image of said bar code contains a plurality of bars.

4. The method of claim 1, further comprising the step of: determining a product code by decoding the waveform.

5. The method claim 1, further comprising the step of: low-pass filtering the captured images in a direction substantially parallel to the bars.

6. The method of claim 1, wherein the alignment between each pair of successive waveform fragments is determined by performing one or more normalized cross-correlations between each pair.

7. The method of claim 1, wherein the waveform is recovered from the aligned waveform fragments by appending each fragment to a previous fragment, and skipping a region overlapping with said previous fragment.

8. The method of claim 1, wherein the waveform is recovered from the aligned waveform fragments by:
    determining an average value for a plurality of sample values of the waveform, said sample values being contained in portions of the waveform contained in overlapping waveform fragments.

9. The method of claim 8, wherein the average value is a weighted average, whereby sample values captured from a centre portion of each image have a higher weight than sample values captured from an edge portion of each image.

10. The method of claim 9, wherein the sample values for each image are weighted in accordance with a Gaussian window for said image.

11. The method of claim 1, wherein the waveform is recovered from the aligned waveform fragments by:
    aligning a current waveform fragment with a partially-constructed waveform constructed using all waveform fragments up to the current fragment.

12. The sensing device of claim 11, wherein a field of view of the image sensor is sufficiently large for capturing an image of a plurality of bars.

13. The sensing device of claim 11, wherein the processor is further configured for:
    determining the alignment between each pair of successive waveform fragments by performing one or more normalized cross-correlations between each pair.

14. The sensing device of claim 11, wherein the processor is further configured for:
    determining an average value for a plurality of sample values of the waveform, said sample values being contained in portions of the waveform contained in overlapping waveform fragments.

15. The sensing device of claim 11 further comprising: communication means for communicating the waveform to a computer system.

16. The method of claim 1, wherein said method is performed only in the absence of a location-indicating tag in a field of view of the image sensor.

17. The sensing device of claim 1, wherein said image sensor has a field of view sufficiently large for capturing an image of a whole location-indicating tag disposed on a surface, and said processor is configured for determining a position of the sensing device relative to the surface using the imaged tag.

18. A sensing device for recovering a waveform representing a linear bar code, said sensing device comprising:
    a two-dimensional image sensor for capturing a plurality of partial two-dimensional images of said bar code during movement of said sensing device relative to said bar code; and
    a processor configured for:
        determining, from at least one of the images, a direction substantially perpendicular to the bars of the bar code using a Hough transform for identifying an orientation of edges in the at least one image;
        determining, substantially along the direction, a waveform fragment corresponding to each captured image;
        determining an alignment between each pair of successive waveform fragments; and
        recovering, from the aligned waveform fragments, the waveform.

19. The sensing device of claim 18, wherein a field of view of the image sensor is smaller than the length of the bar code.

* * * * *